(12) United States Patent
Agrawal et al.

(10) Patent No.: US 12,100,323 B1
(45) Date of Patent: Sep. 24, 2024

(54) MANAGING CONCURRENT USE OF FRONT AND BACK PORTIONS OF AN ADAPTIVE ROLLABLE DISPLAY DEVICE BASED ON IMAGING USER(S)

(71) Applicant: MOTOROLA MOBILITY LLC, Wilmington, DE (US)

(72) Inventors: Amit Kumar Agrawal, Bangalore (IN); Boby Iyer, Elmhurst, IL (US); Hua Zhang, Hinsdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/357,581

(22) Filed: Jul. 24, 2023

(51) Int. Cl.
*G09F 9/30* (2006.01)
*G02F 1/1333* (2006.01)
*G06F 3/14* (2006.01)

(52) U.S. Cl.
CPC ........ *G09F 9/301* (2013.01); *G02F 1/133342* (2021.01); *G06F 3/14* (2013.01)

(58) Field of Classification Search
None
See application file for complete search history.

(56) References Cited

U.S. PATENT DOCUMENTS

| 2021/0303027 | A1* | 9/2021 | Kim  | G06F 1/1694 |
| 2022/0155823 | A1* | 5/2022 | Shin | G06F 1/1624 |

\* cited by examiner

Primary Examiner — Nicholas J Lee
(74) Attorney, Agent, or Firm — Isidore PLLC

(57) ABSTRACT

An electronic device, method, and computer program product manage concurrent use of different portions of an adaptive rollable display device enabling the electronic device to differently support two local users. A first image is received from a first image capturing device of the electronic device. The first image capturing device is disposed in one of a front side and a back side of a device housing of the electronic device and has an associated field of view extending from a respective side of the device housing. First user content is generated based at least in part on the first image and presented on a corresponding one of a front display and back display(s) corresponding to the first user. Second user content is generated based at least in part on the first image and presented on another one of the front display and the back display(s) corresponding to a second user.

18 Claims, 17 Drawing Sheets

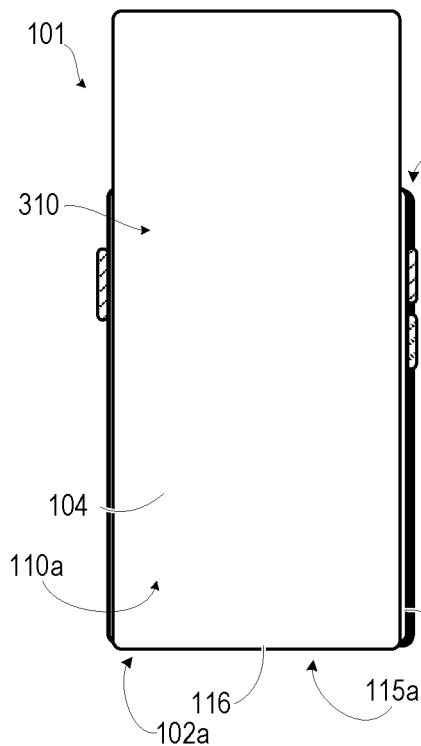 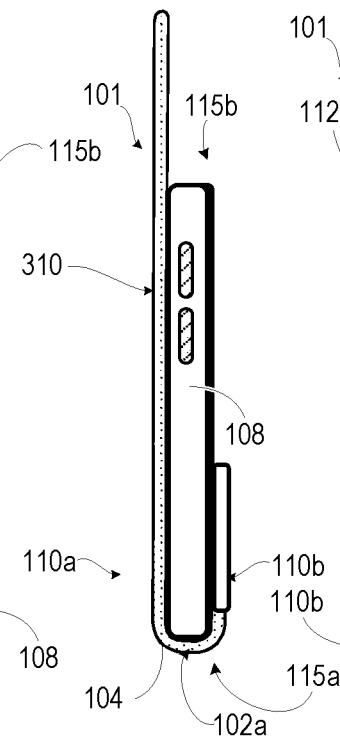 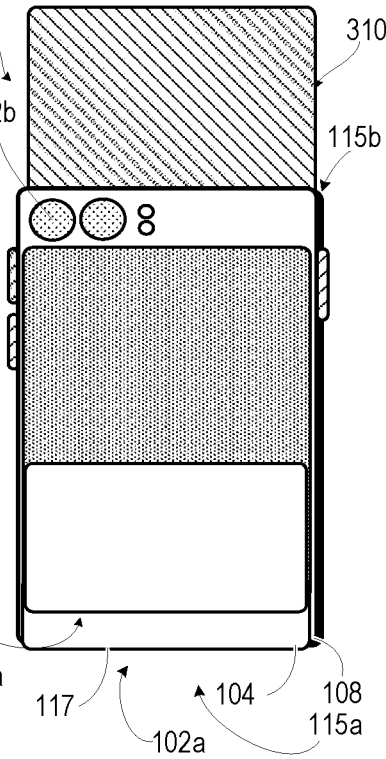
*FIG. 11A*  *FIG. 11B*  *FIG. 11C*
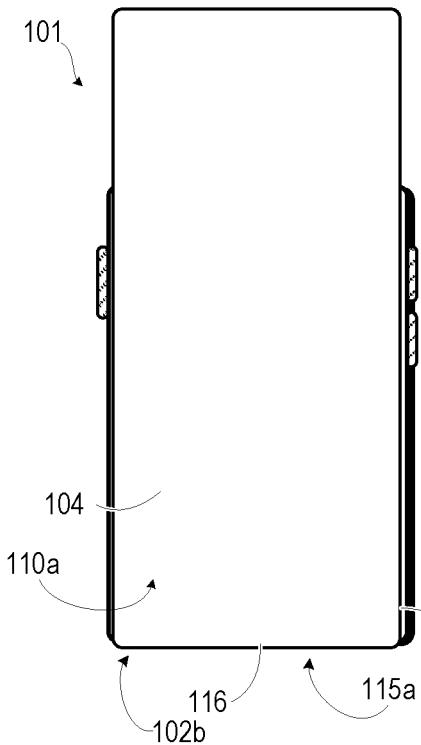 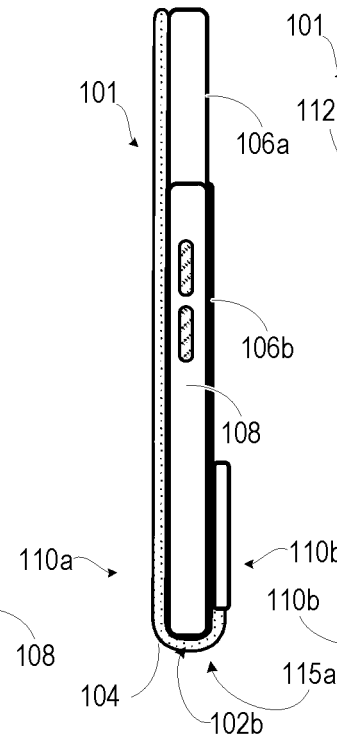 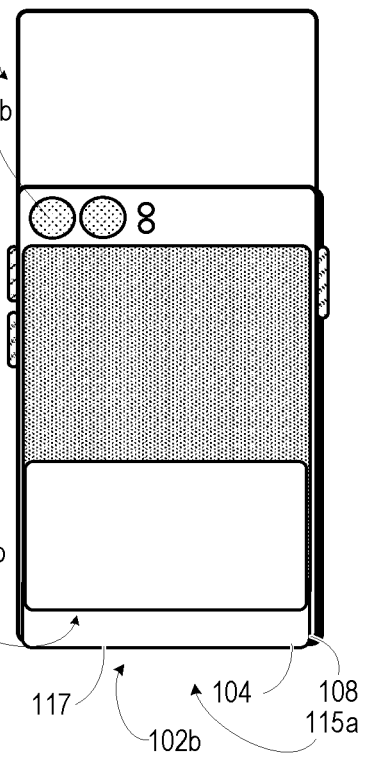
*FIG. 12A*  *FIG. 12B*  *FIG. 12C*

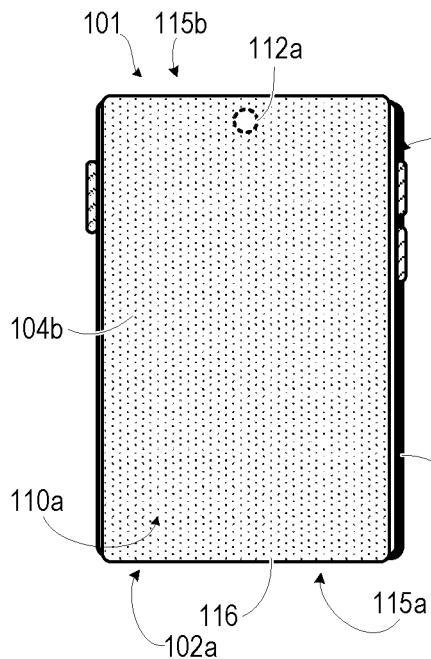 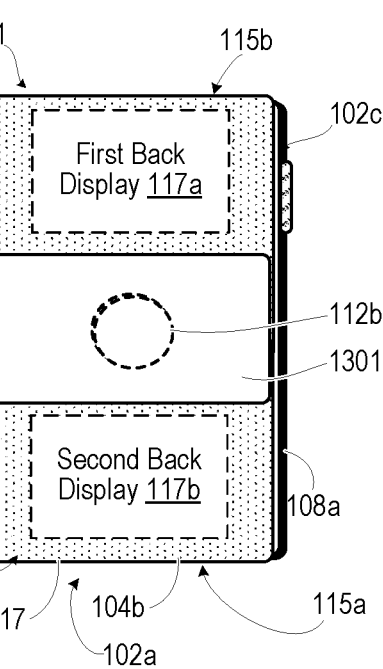 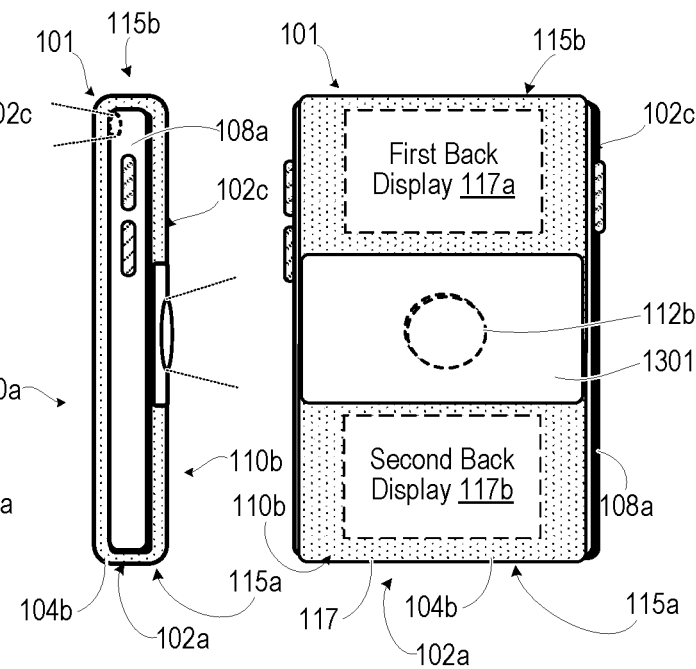
*FIG. 13A*  *FIG. 13B*  *FIG. 13C*
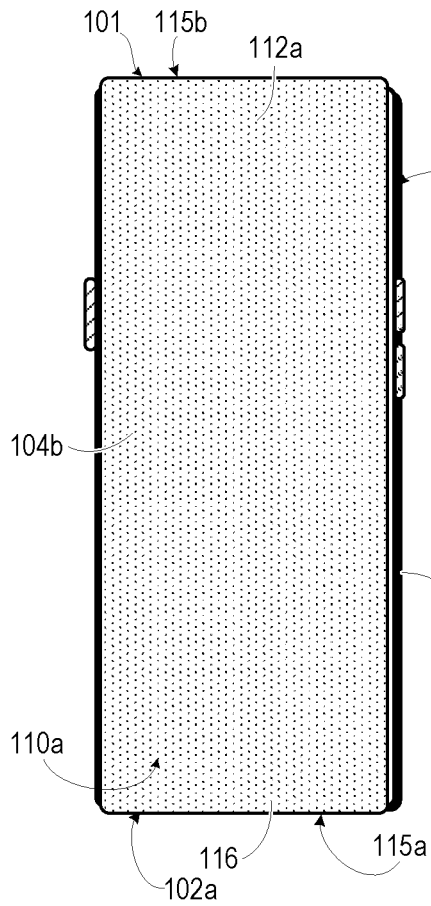 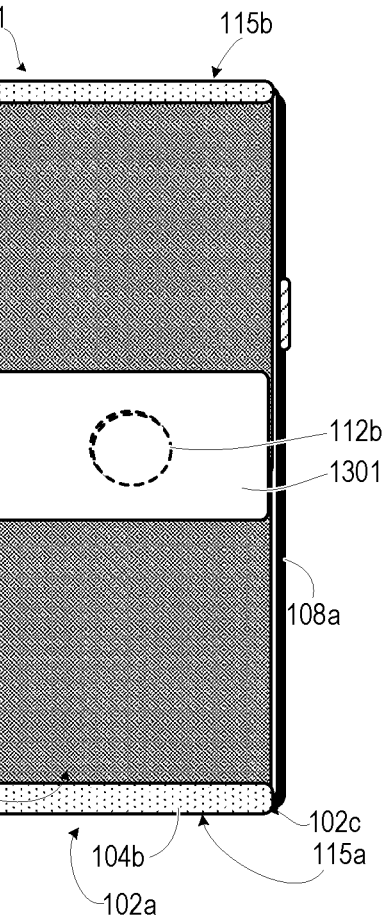 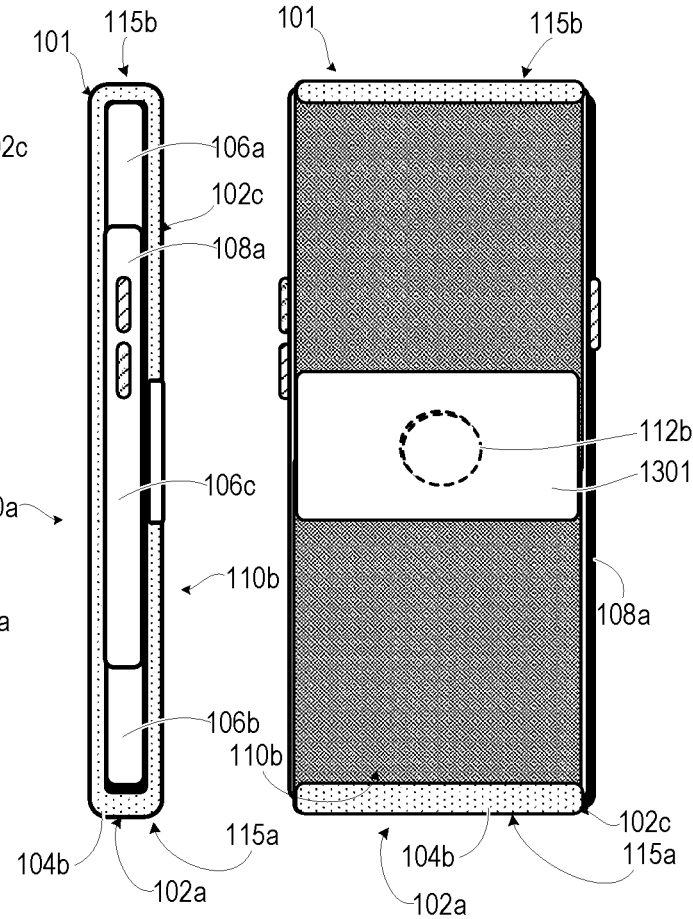
*FIG. 14A*  *FIG. 14B*  *FIG. 14C*

MANAGING CONCURRENT USE OF FRONT AND BACK PORTIONS OF AN ADAPTIVE ROLLABLE DISPLAY DEVICE BASED ON IMAGING USER(S)

BACKGROUND

1. Technical Field

The present disclosure relates generally to communication devices having a flexible display in a rolling form factor, and in particular to communication devices having the flexible display rolled onto both front and back sides.

2. Description of the Related Art

Portable electronic communication devices, particularly smartphones, have become ubiquitous. People all over the world use such devices to stay connected. These devices have been designed in various mechanical configurations. A first configuration, known as a "candy bar", is generally rectangular in shape, has a rigid form factor, and has a display disposed along a major face of the electronic device. By contrast, a "clamshell" device has a mechanical hinge that allows one housing to pivot relative to the other. A third type of electronic device is a "slider" where two different device housings slide, with one device housing sliding relative to the other.

With development of a flexible display, additional configurations have become available that enable changing a size of an area of the housing that is covered by a display. One configuration is a scrollable device having a flexible display covering a telescoping frame. While retracting, an excess portion of the flexible display scrolls into the telescoping frame. In addition, a number of configurations provide rollable devices that roll a portion of the flexible display onto a back side of a device housing when the display or extended frame supporting the display is retracted to present a smaller front dimension. In an example, a telescoping frame can include one or two rollers to enable the flexible display to roll around a corresponding one or two ends. In another example, a blade assembly provides a thinner telescoping blade than a telescoping frame. The blade assembly includes a flexible display with one portion that rolls around one end and another end that can extend away from a single device housing. While in the retracted position, these three types of rollable devices have one or two portions of the flexible display on the back side of the device housing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 11A depicts a front view of an example communication device of FIG. 1 having a blade assembly in an extended position, according to one or more embodiments;

FIG. 11B depicts a left side view of the communication device of FIG. 11A having the blade assembly in the extended position, according to one or more embodiments;

FIG. 11C depicts a back view of the communication device of FIG. 11A having the blade assembly in the extended position, according to one or more embodiments;

FIG. 12A depicts a front view of another example communication device of FIG. 1 having a telescoping frame in an extended position, according to one or more embodiments;

FIG. 12B depicts a left side view of the communication device of FIG. 12A having the telescoping frame in the extended position, according to one or more embodiments;

FIG. 12C depicts a back view of the communication device of FIG. 12A having the telescoping frame in the extended position, according to one or more embodiments;

FIG. 13A depicts a front view of an additional example communication device having a rollable display on a telescoping frame configured to enable the display to roll around opposed ends of the device when in a retracted position, according to one or more embodiments;

FIG. 13B depicts a left side view of the communication device of FIG. 13A having the telescoping frame in the retracted position, according to one or more embodiments;

FIG. 13C depicts a back view of the communication device of FIG. 13A having the telescoping frame in the retracted position, according to one or more embodiments;

FIG. 14A depicts a front view of the communication device of FIG. 13A having the telescoping frame in an extended position, according to one or more embodiments;

FIG. 14B depicts a left side view of the communication device of FIG. 14A having the telescoping frame in the extended position, according to one or more embodiments;

FIG. 14C depicts a back view of the communication device of FIG. 14A having the telescoping frame in the extended position, according to one or more embodiments;

DETAILED DESCRIPTION

Figure 1:
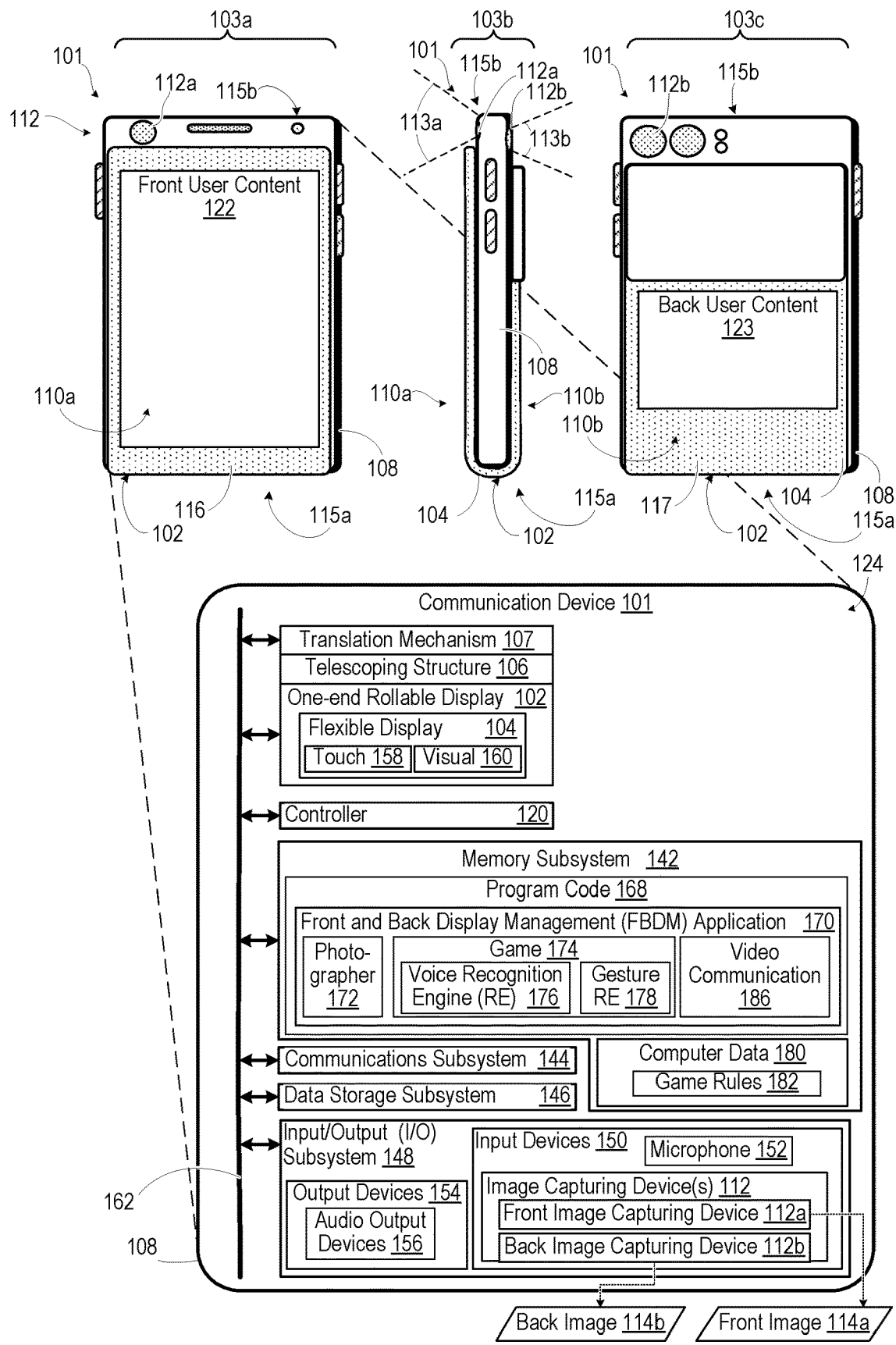
FIG. 1 presents a simplified functional block diagram of a communication device having a rollable display, shown with a front view, side view, and back view of the rollable display, which rotates around a single end of the device housing, according to one or more embodiments.

According to aspects of the present disclosure, an electronic device, method, and computer program product manage concurrent use of front and rear portions of an adaptive rollable display device enabling the electronic device to concurrently present different content and support two local users interfacing with respective portions of the display on opposed sides of the device. In one or more embodiments, an electronic device includes a device housing having a front side and a back side opposed to the front side. The electronic device includes at least one first image capturing device disposed in one of the front side or the back side of the device housing. The at least one first image capturing device has a first field of view extending from the corresponding side of the device housing. The electronic device includes a rollable display rollable over at least one edge of the device housing to provide a front display on the front side and at least one back display on the back side. The electronic device includes a translation mechanism operable to slide the rollable display relative to the device housing between a fully retracted position and a fully extended position. A controller of the electronic device is communicatively coupled to the at least one first image capturing device, the rollable display, and the translation mechanism. In response to identifying a trigger for a front and back display operating mode to concurrently support use of the front display for interfacing by a first user positioned to view the front side of the rollable display and use of the at least one back display for interfacing by a back user positioned to view the back side of the rollable display. The controller receives at least one first image from one of the at least one first image capturing devices. The controller generates front display content based at least in part on the at least one first image. The controller presents the front display content on the front display. The generates back display content related to, and different from, the front display content. The controller presents the back display content on the at least one back display.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 2:
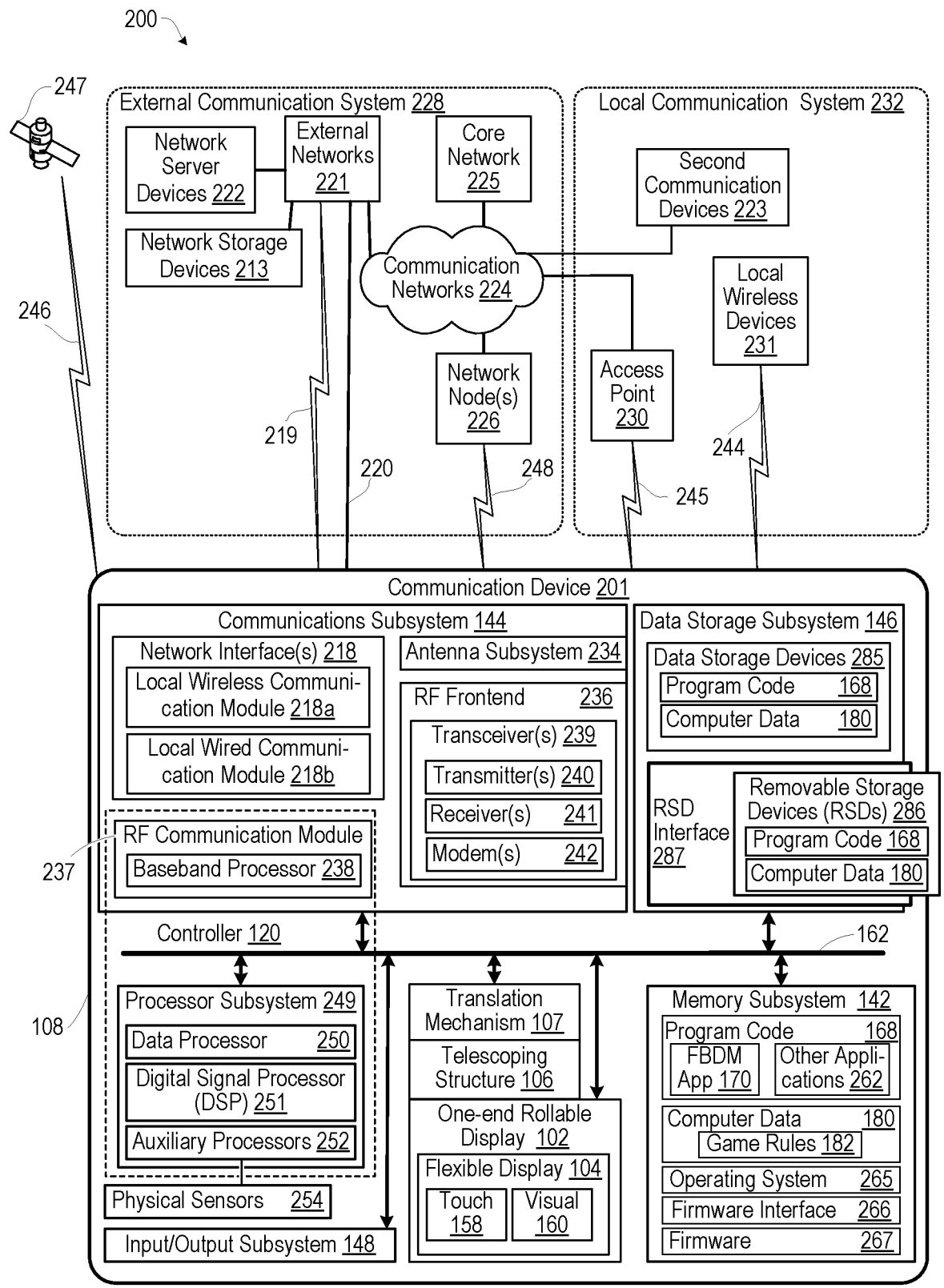
FIG. 2 depicts a functional block diagram of a communication environment including the communication device of FIG. 1, according to one or more embodiments.

FIG. 1 presents a simplified functional block diagram of an electronic device that is a rollable display device, referenced herein as communication device 101, and in which the features of the present disclosure are advantageously implemented. FIG. 2 is a functional block diagram of a communication environment 200 that includes communication device 101 and in which additional optional features, such as wireless communication components, are introduced below. Communication device 101 of FIG. 1 or 2 includes rollable display 102 in a retracted position depicted in a front view at 103a, in left side view at 103b, and in a back view at 103c. Telescoping structure 106 is movable by translation mechanism 107 between a fully extended position and a fully retracted position. In an example, rollable display 102 of FIG. 1 may be implemented having blade assembly 310 incorporating a telescoping structure as blade substrate 312 (FIG. 3) that positions flexible display 104, as described below with regard to FIGS. 3-10 and 11A-11C. In another example, rollable display 102 of FIG. 1 may be implemented as rollable display 102b comprising flexible display 104 received on a telescoping structure provided by telescoping structure 106b of device housing 108, as described below with regard to FIGS. 12A-12C. In an alternative example, communication device 101 of FIG. 1 or FIG. 2 may include rollable display 102c positioned by telescoping structure 106c of device housing 108 as described below with regard to FIGS. 13A-13C and 14A-14C. In one or more embodiment, translation mechanism 107 may include motor-driven roller(s) engaged to rollable display 102c to move rollable display 102c as telescoping structure 106c is expanded or retracted. In one or more embodiments, rollable display 102c is guided to be pulled onto front side 110a of telescoping structure 106c as telescoping structure 106c expands. Similarly, rollable display 102c is guided to be pushed onto back side 110b of telescoping structure 106c as telescoping structure 106c retracts.

With continued reference to FIG. 1, electronic device 101 includes device housing 108 having front side 110a and back side 110b opposed to the front side 110a. Electronic device 101 includes at least one image capturing device 112 that may include at least one front image capturing device 112a disposed on front side 110a and/or at least one back image capturing device 112b disposed on back side 110b of device housing 108. Front image capturing device(s) 112a has associated front field of view 113a extending from front side 110a of device housing 108. Front image capturing device 112a provides front image 114a (e.g., still image or video image). Back image capturing device(s) 112b has associated back field of view 113b extending from back side 110b of device housing 108. Back image capturing device 112b provides back image 114b (e.g., still image or video image). Rollable display 102 is rollable over first rolling edge 115a of device housing 108 to provide front display 116 on front side and at least one back display 117 on back side 110b at least while the rollable display is in a retracted position. As oriented, first rolling edge 115a is a bottom edge of device housing 108. However, electronic device 101 may be oriented differently such that edge 115a may appear to be a right edge, a left edge, or a top edge. In one or more embodiments, second edge 115b opposite to first rolling edge 115a may perform as a second rolling edge. Electronic device includes translation mechanism 107 operable to slide rollable display 102 relative to device housing 108 between a fully retracted position and a fully extended position. Embodiments of rollable display 102 described below, including translation mechanism 107 that act on rollable display 102 directly (e.g., blade assembly 310 of FIGS. 3-10 and 11A-11C) or indirectly (e.g., via telescoping structure 106 of FIGS. 12A-12C, FIGS. 13A-13C and 14A-14C) to cause movement.

Controller 120 is communicatively coupled to the at least one image capturing device 112, including a first image capturing device, rollable display 102, and translation mechanism 107. Controller 120 receives first image from first image capturing device. Controller 120 generates first user content based at least in part on the first image. Controller 120 presents the first user content on a corresponding one of front display 116 and at least one back display 117 that corresponds to a position/location of first user. Controller 120 generates second user content based at least in part on the first image. Controller 120 presents the second user content on another one of front display 116 and at least one back display 117 corresponding to a second user. Front and back user content 122 and 123 are presented respectively on front and back displays 116 and 117. Examples of first and second user content are provided below with regard to FIGS. 15A-15B for a photographer-photographed subject scenario, FIGS. 16A-16B for a game scenario, and FIGS. 17A-17B for a multiparty video communication session.

Figure 3:
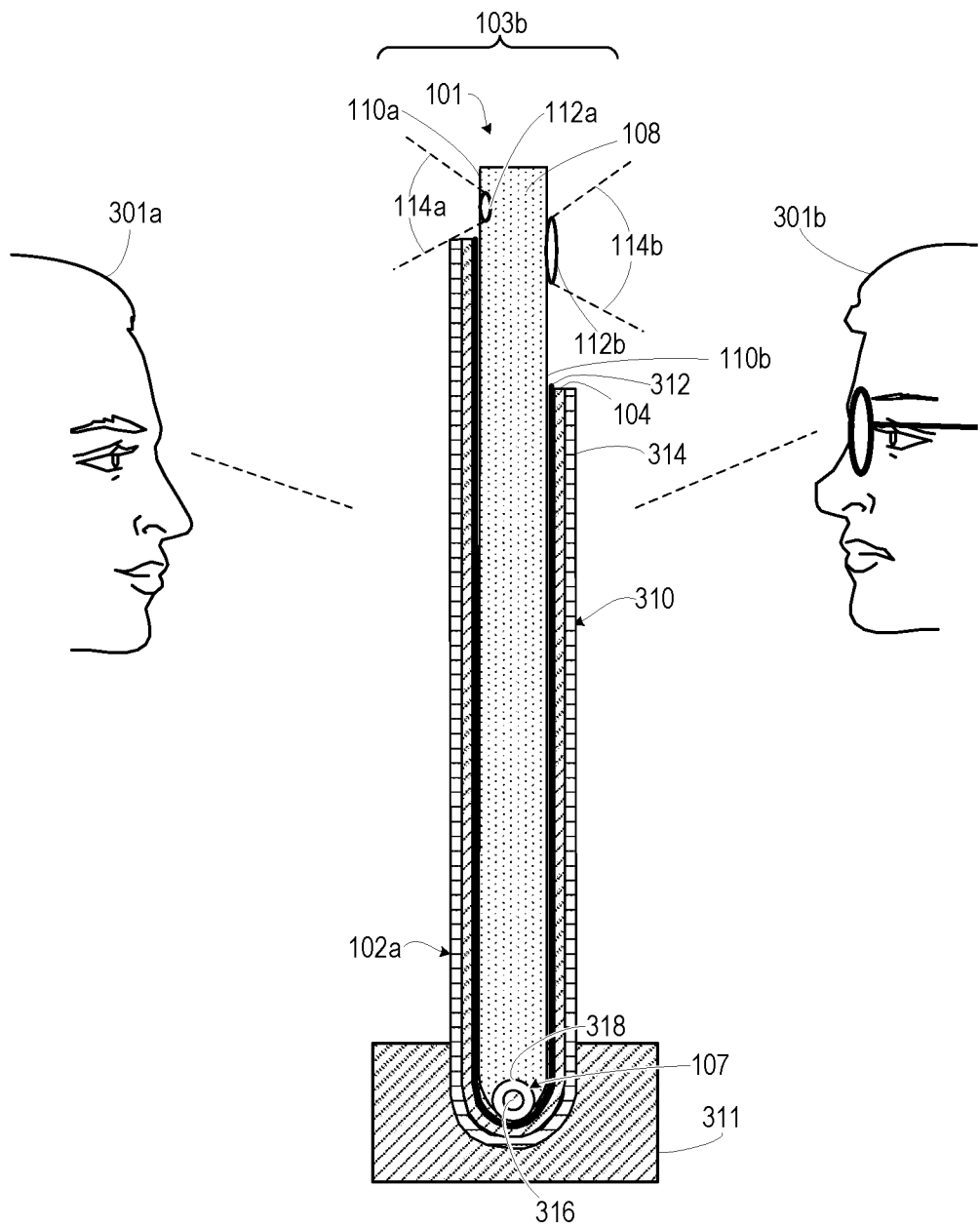
FIG. 3 depicts a left side cutaway view of the example communication device of FIG. 1 with a first user viewing a front side and a second user viewing a back side of the flexible display, according to one or more embodiments.

FIG. 3 depicts a left side cutaway view of the example communication device 101 of FIG. 1 or communication device 201 of FIG. 2 including rollable display 102a having blade assembly 310. Communication device 101 may be positioned in dock 311. Blade assembly 310 includes blade substrate 312 that slides on/over device housing 108. Flexible display 104 is attached to blade substrate 312 and covered by flexible protective cover 314. Translation mechanism 107 includes motor 316 that turns roller 318 to position blade substrate 312. While rollable display 102a is in the retracted position, front user 301a is viewing front side 110a and back user 301b is viewing back side of flexible display 104. Rollable display 102a is retracted to a peek position exposing front and back image capturing devices 112a-112b. Front user 301a is in front field of view 113a of front image capturing device 112a. Back user 301b is in back field of view 113b of back image capturing device 112b. In an example, the first image capturing device is front image capturing device 112a that provides first image as front image 114a (FIG. 1). An example implementation of rollable display 102a is described below regarding FIGS. 4-10. In one or more scenarios, one of front and back users 301a-301b may be in control of communication device 101 while the use by another one of one of front and back users 301a-301b of the communication device 101 is limited to viewing presented visual content (e.g., a photographer-photographed subject scenario). In one or more scenarios, one of front and back users 301a-301b may be in control of communication device 101 while the use by another one of one of front and back users 301a-301b of is limited to viewing presented visual content and providing audio or gesture inputs (e.g., a game scenario). In one or more scenarios, both front and back users 301a-301b may be provided control of communication device 101 (e.g., video communication scenario).

With continued reference to FIG. 1, functional components 124 of communication device 101 include controller 120, memory subsystem 142, communications subsystem 144, data storage subsystem 146, and input/output (I/O) subsystem 148. I/O subsystem 148 includes I/O devices such as flexible display 104, other input devices 150 such as image capturing devices 112, and microphone 152. I/O subsystem 144 further includes other output devices 154 such as audio output device 156. In one or more embodiments, flexible display 104 includes touch screen 158, which is an example of input devices 150, and includes visual screen 160, which is an example of output device 154. To enable management by controller 120, system interlink 162 communicatively connects controller 120 with memory subsystem 142, communications subsystem 144, data storage subsystem 146, and I/O subsystem 148. System interlink 162 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 162) are illustrated in FIGS. 1-2, it is to be understood that more, fewer, or different interconnections may be present in other embodiments.

Memory subsystem 142 stores program code 168 such as front and back display management (FBDM) application 170 that, when executed by controller 120, configures communication device 101 to manage concurrent use of different portions of an adaptive rollable display device enabling the electronic device to differently support presenting visual content to two local users on opposed sides of the device.

In one or more embodiments, FBDM application 170 includes or supports photographer-photographed subject application 172 that, when executed by controller 120, configures communication device 101 to provide first and the second user content as two or more different photographic rendering of the first image. An example is described below with reference to FIGS. 15A-15B.

In one or more embodiments, FBDM application 170 includes or supports game application 174, which includes voice and gesture recognition engines 176 and 178 that, when executed by controller 120, configures communication device 101 to act as a game referee for at least one first user and at least one second user according to computer data 180, such as game rules 182, stored in memory subsystem 142. An example is described below with reference to FIGS. 16A-16B.

In one or more embodiments, FBDM application 170 includes or supports video communication application 186 that, when executed by controller 120, configures communication device 101, during a video conference session with remote users, to support first user and second user having dedicated first and second displays, respectively, on opposed sides of communication device 101. An example is described below with reference to FIGS. 17A-17B.

FIG. 2 is a functional block diagram of a communication environment 200 that includes communication device 101 and in which additional optional features, such as wireless communication, of the present disclosure are advantageously implemented. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

In one or more embodiments, communications subsystem 144 may include one or more network interfaces 218, such as local wireless communication module 218a and local wired communication module 218b, to communicatively couple communication device 101 respectively via wireless connection 219 or network cable 220 to external networks 221. Communication device 101, via external networks 221, may connect to network storage devices 213 that store computer data and to network server devices 222 that facilitate access to network storage devices 213. Network server devices 222 may have identical or similar components and functionality as described above for communication device 101. Communication device 101 may communicate with second communication devices 223 via external networks 221 or via communication networks 224 that are supported by core networks 225. Network interface(s) 218 may include a network interface controller (NIC) and support one or more network communication protocols. External networks 221 can include a local area network (LAN), a campus area network (CAN), a metropolitan area network (MAN), or a wide area network (WAN). For example, wireless connection 219 and network cable 220 can be an Ethernet connection/cable.

In one or more embodiments, communications subsystem 144 may include additional functionality for communicating, using a cellular connection, with network node(s) 226 of external communication system 228 and for communicating, using a wireless connection, with wireless access point 230 or local wireless devices 231 of local communication system 232. Communications subsystem 144 includes antenna subsystem 234. Communications subsystem 144 includes radio frequency (RF) front end 236 and RF communication module 237 having baseband processor 238. RF front end 236 includes transceiver(s) 239, which includes transmitter(s) 240 and receiver(s) 241. RF front end 236 further includes modem(s) 242. Baseband processor 238 of RF communication module 237 communicates with controller 120 and RF front end 236. Baseband processor 238 operates in a baseband frequency range to encode data for transmission and decode received data, according to a communication protocol. Modem(s) 242 modulates baseband encoded data from RF communication module 237 onto a carrier signal to provide a transmit signal that is amplified by transmitter(s) 240. Modem(s) 242 demodulates each signal received using antenna subsystem 234 from external communication system 228 or local communication system 232. The received signal is amplified and filtered by receiver(s) 241, which demodulates received encoded data from a received carrier signal.

In one or more embodiments, controller 120, via communications subsystem 144, performs multiple types of cellular over-the-air (OTA) or wireless communication with local communication system 232. Communications subsystem 144 can communicate via an OTA connection 244 with local wireless devices 231. In an example, OTA connection 244 is a Bluetooth connection, or other personal access network (PAN) connection. In one or more embodiments, communications subsystem 234 communicates with one or more locally networked devices via a wireless local area network (WLAN) link 245 supported by access point 230. In one or more embodiments, access point 230 supports communication using one or more IEEE 802.11 WLAN protocols. Access point 230 is connected to communication networks 224 via a cellular or wired connection. In one or more embodiments, communications subsystem 144 receives downlink channels 246 from GPS satellites 247 to obtain geospatial location information. Communications subsystem 144 can communicate via an over-the-air (OTA) cellular connection 248 with network node(s) 226.

Controller 120 includes processor subsystem 249, which includes one or more central processing units (CPUs), depicted as data processor 250. Processor subsystem 249 can include one or more digital signal processors 251 that can be integrated with data processor 250. Processor subsystem 249 can include other processors that are communicatively coupled to data processor 250, such as baseband processors 238 of communication module 237. In another example, auxiliary processors 252 may act as a low power consumption, always-on sensor hub for physical sensors 254. In one or more embodiments that are not depicted, controller 120 can further include distributed processing and control components that are external to device housing 108 or grouped with other components, such as I/O subsystem 148. Data processor 250 is communicatively coupled, via system interlink 162, to memory subsystem 142. In one or more embodiments, data processor 250 is communicatively coupled via system interlink 162 to communications subsystem 144, data storage subsystem 146 and I/O subsystem 148. Controller 120 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 142 stores program code 168 for execution by processor subsystem 249 to provide the functionality described herein. Program code 168 includes applications such as FBDM application 170 that generates visual content for a user interface. Program code 168 includes front and back display management (FBDM) application 170 that may be software or firmware that, when executed by controller 120, configures communication device 101 to manage concurrent use of different portions of an adaptive rollable display device enabling the electronic device to differently support two local users. Program code 168 may include other applications 262. In one or more embodiments, several of the described aspects of the present disclosure are provided via executable program code of applications executed by controller 120. In one or more embodiments, program code 168 may be integrated into a distinct chipset or hardware module as firmware that operates separately from executable program code. Portions of program code 168 may be incorporated into different hardware components that operate in a distributed or collaborative manner. Implementation of program code 168 may use any known mechanism or process for doing so using integrated hardware and/or software, as known by those skilled in the art. Program code 168 may access, use, generate, modify, store, or communicate computer data 180, such as game rules 182.

Computer data 180 may incorporate "data" that originated as raw, real-world "analog" information that consists of basic facts and figures. Computer data 180 includes different forms of data, such as numerical data, images, coding, notes, and financial data. Computer data 180 may originate at communication device 101 or be retrieved by communication device 101. Communication device 101 may store, modify, present, or transmit computer data 180. Computer data 180 may be organized in one of a number of different data structures. Common examples of computer data 180 include video, graphics, text, and images as discussed herein. Computer data 180 can also be in other forms of flat files, databases, and other data structures.

Memory subsystem 142 further includes operating system (OS) 265, firmware interface 266, such as basic input/output system (BIOS) or Uniform Extensible Firmware Interface (UEFI), and firmware 267, which may be considered as program code 168.

Data storage subsystem 146 of communication device 101 includes data storage device(s) 285. Controller 120 is communicatively connected, via system interlink 162, to data storage device(s) 285. Data storage subsystem 146 provides program code 168 and computer data 180 stored on non-volatile storage that is accessible by controller 120. For example, data storage subsystem 146 can provide a selection of program code 168 and computer data 180. These applications can be loaded into memory subsystem 142 for execution/processing by controller 120. In one or more embodiments, data storage device(s) 285 can include hard disk drives (HDDs), optical disk drives, and/or solid-state drives (SSDs), etc. Data storage subsystem 146 of communication device 101 can include removable storage device(s) (RSD(s)) 286, which is received in RSD interface 287. Controller 120 is communicatively connected to RSD 286, via system interlink 162 and RSD interface 287. In one or more embodiments, RSD 286 is a non-transitory computer program product or computer readable storage device. Controller 120 can access data storage device(s) 285 or RSD 286 to provision communication device 101 with program code 168.

Figure 4:
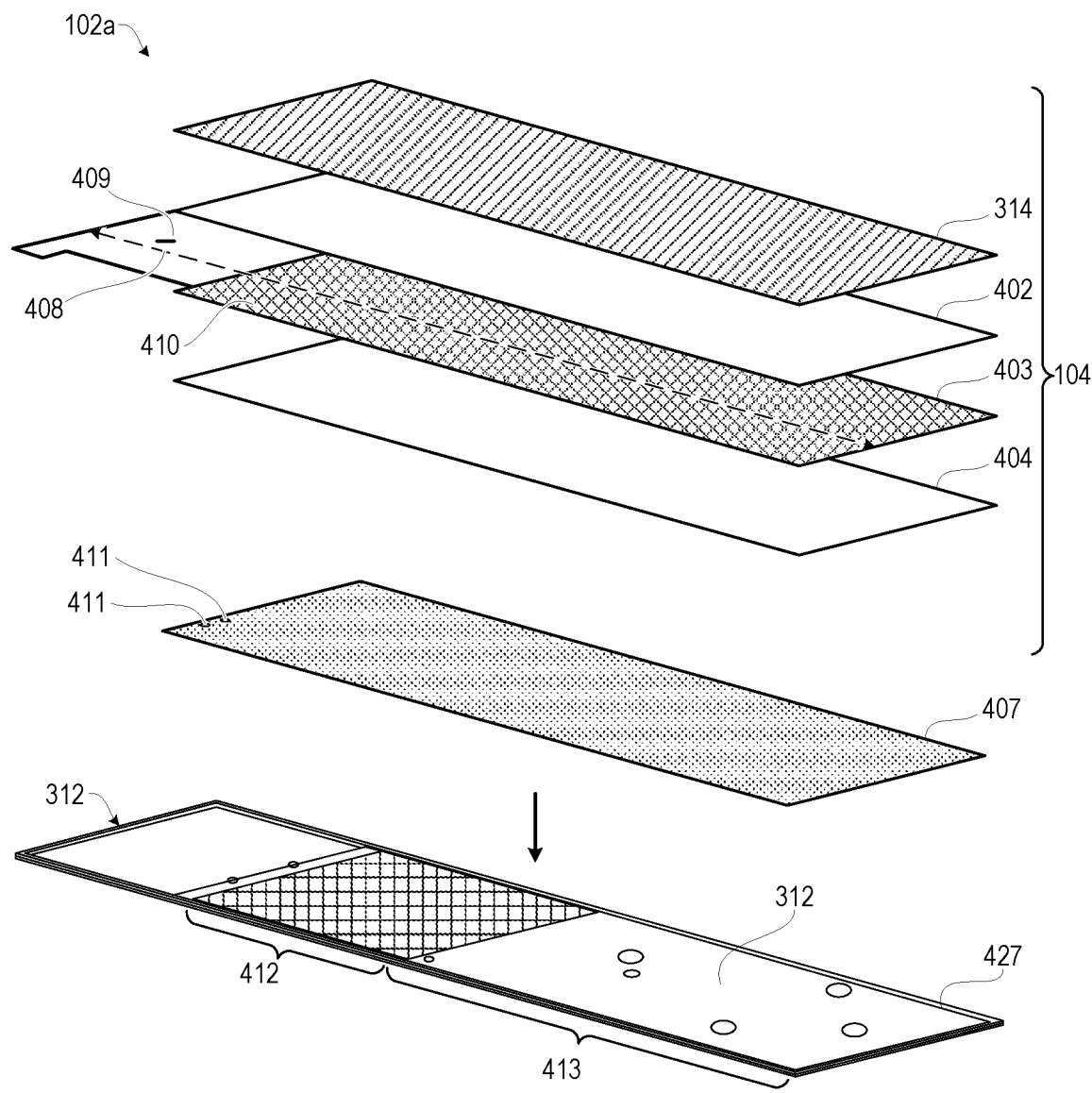
FIG. 4 depicts an example flexible display incorporated in a blade assembly in an exploded view, the blade assembly for a first rollable device version of the communication device, according to one or more embodiments.

FIG. 4 depicts rollable display 102a in an exploded view in which flexible display 104 is incorporated in blade assembly 312. In one or more embodiments, flexible display 104 includes one or more layers that are coupled or laminated together to complete flexible display 104. In an example, flexible display 104 includes flexible protective cover 314, first adhesive layer 402, flexible display layer 403, second adhesive layer 404, and flexible substrate 407. Beginning from the top of the layer stack opposite to blade substrate 312, in one or more embodiments, flexible protective cover 314 includes an optically transparent substrate such as a thin film sheet of a thermoplastic material. In an example, flexible protective cover 314 is manufactured from a layer of optically transparent polyamide or polycarbonate having a thickness of about eighty microns. Flexible protective cover 314 may function as a fascia by defining a cover for flexible display layer 403. In one or more embodiments, flexible protective cover 314 is optically transparent, in that light can pass through the flexible protective cover 314 so that objects behind flexible protective cover 314 can be distinctly seen. Flexible protective cover 314 may optionally include an ultraviolet barrier. Such a barrier can be useful in improving the visibility of flexible display layer 403.

Beneath flexible protective cover 314 is first adhesive layer 402. In one or more embodiments, first adhesive layer 402 is an optically transparent adhesive. The optically transparent adhesive can be applied to two sides of a thin, optically transparent substrate such that the first adhesive layer 402 functions as an optically transparent layer having optically transparent adhesive on both sides. When configured as "double-sided tape", first adhesive layer 402 may have a thickness of about fifty microns that can then be spooled and applied between, to couple together, flexible protective cover 314 and flexible display layer 403. In other embodiments, first adhesive layer 402 may be applied between flexible protective cover 314 and the display layer 403 as an optically transparent liquid or gel that is allowed to cure or optionally cured by heat, ultraviolet light, or other techniques. First adhesive layer 402 mechanically couples flexible display layer 403 to flexible protective cover 314.

Flexible display layer 403 includes image producing portion 409 having a same length and width, and aligned with, flexible protective cover 314 and flexible substrate 407. In one or more embodiments, flexible display layer 403 includes T-shaped tongue 410 attached along major axis 408 of flexible display layer 403. Blade substrate 312 is sized to receive flexible display layer 403 attached to T-shaped tongue 410. In one or more embodiments, electronic circuit components configured to operate image producing portion 409 of the flexible display layer 403, connectors, and other components can be coupled to this T-shaped tongue 410 and further coupled to image producing portion 409 of flexible display 104. For instance, as shown in FIG. 4, flexible display layer 403 includes a T-shaped tongue 410 that extends beyond image producing portion 409 of flexible display layer 403 and other layers (314, 402, 404, 405, 406, and 407) of flexible display 104. While T-shaped tongue 410 is T-shaped in this illustrative embodiment, T-shaped tongue 410 can take other shapes.

Flexible display layer 403 optionally may be touch-sensitive. In one or more embodiments, flexible display layer 403 is an organic light emitting diode (OLED) display layer. When coupled to flexible substrate 407, flexible display layer 403 can bend in accordance with various bending radii. For example, some embodiments allow bending radii of between thirty and six hundred millimeters. Other substrates allow bending radii of around five millimeters to provide a display that is foldable through active bending. Other configurations of flexible display 104 may accommodate both bends and folds. In one or more embodiments, flexible display layer 403 may be formed from multiple layers of flexible material such as flexible sheets of polymer or other materials. Flexible display layer 403 may include a layer of optically pellucid electrical conductors, a polarizer layer, one or more optically transparent substrates, and layers of electronic control circuitry such as thin film transistors to actuate pixels and one or more capacitors for energy storage. In one or more embodiments, flexible display layer 403 has a thickness of about 130 microns.

In one or more embodiments, to be touch sensitive, flexible display layer 403 includes a layer including one or more optically transparent electrodes. In one or more embodiments, flexible display layer 403 includes an organic light emitting diode layer configured to present images and other information to user 301a-301b (FIG. 3). The organic light emitting diode layer can include one or more pixel structures arranged in an array, with each pixel structure including a plurality of electroluminescent elements, such as organic light emitting diodes. These various layers can be coupled to one or more optically transparent substrates of flexible display layer 403. In one or more embodiments, flexible substrate 407 includes a thin layer of steel having a thickness of about thirty microns. In one or more embodiments, flexible substrate 407 includes a thin layer of thermoplastic material.

In other embodiments, a combined layer (314 and 402) above flexible display layer 403 may be configured with enough stiffness to make the flexible substrate 407 unnecessary. In an example, flexible protective cover 314 is configured with enough stiffness to provide sufficient protection for flexible display 104 during bending, enabling flexible substrate 407 to be omitted.

Flexible display 104 is supported by flexible substrate 407 and by blade substrate 312 having blade substrate 312. In one or more embodiments, blade substrate 312 includes a layer of steel. In one or more embodiments, blade substrate 312 is thicker than flexible substrate 407. In an example, flexible substrate 407 includes a steel layer with a thickness of about thirty microns and blade substrate 312 includes a layer of steel having a thickness of about one hundred microns. In one or more embodiments, blade substrate 312 is a rigid, substantially planar support layer. In an example, blade substrate 312 may be manufactured from stainless steel, from a thin, rigid thermoplastic sheet, or from nitinol material, which is a nickel-titanium alloy.

In one or more embodiments, the flexible substrate 407 is slightly longer along a major axis of the flexible substrate 407 than is the image producing portion 409 of the flexible display 104. Since the T-shaped tongue 410 is T-shaped, this allows one or more apertures 411 to be exposed on either side of the base of the T of the T-shaped tongue 410. As will be described in more detail below, this extra length along the major axis provided by the flexible substrate 407 allows one or more fasteners to rigidly couple the first end of the flexible substrate 407 to a tensioner.

Embodiments of the disclosure contemplate that some of the layers comprising the flexible display 104 are stiffer than others. Similarly, other layers of the flexible display 104 are softer than others. For example, where the flexible substrate 407 is manufactured from a metal, one example of which is stainless steel, this layer is stiffer than the first adhesive layer 402. In one or more embodiments, the stainless steel is stiffer than the flexible display layer 403 as well. In one or more embodiments, the flexible substrate 407 is the stiffest layer in the flexible display 104, while the first adhesive layer is the softest layers of the flexible display 104. The flexible protective cover 314 and the flexible display layer 403 have a stiffness that falls between that of the flexible substrate 407 and the adhesive layers in one or more embodiments.

In one or more embodiments, blade substrate 312 of blade substrate 312 includes both flexible portion 412 and rigid portion 413. Flexible portion 412 is positioned to encounter bending in translation of blade assembly 312 from the retracted position to the extended position. Rigid portion 413 is positioned to remain on front side 110a of device housing 108 (FIG. 1) during translation. In the extended position, rigid portion 413 extends beyond front side 110a of device housing 108 (FIG. 1). In an example, blade substrate 312 is manufactured from a metal such as steel having a thickness of one hundred microns that provides rigidity to rigid portion 413.

In one or more embodiments, blade substrate 312 includes silicone border 427 positioned around a perimeter of blade substrate 312 to protect the edges of flexible display 104 when attached to blade substrate 312 of blade substrate 312. In one or more embodiments, silicone border 427 is co-molded around the perimeter of blade substrate 312.

In one or more embodiments, rigid portion 413 of blade substrate 312 can define one or more apertures. These apertures can be used for a variety of purposes. In an example, some of the apertures can be used to rigidly fasten blade substrate 312 to translation mechanism 107 (FIG. 1), such as a display roller mechanism. Additionally, some of the apertures can contain magnets. Hall-effect sensors positioned in device housing 108 (FIG. 1) to which blade assembly 310 is coupled can then detect the positions of these magnets such that controller 120 (FIG. 1) can determine whether blade assembly 310 including flexible display 104 are in the extended position, the retracted position, the peck position, or an intermediate position.

In one or more embodiments, flexible display 104 is coupled to blade substrate 312 of blade substrate 312 within the confines of silicone border 427. In an example, a first end of flexible display 104 is adhesively coupled to rigid portion 413 of blade substrate 312 of blade substrate 312. The other end of flexible display 104 may be rigidly coupled to a tensioner by passing fasteners through apertures 411 of flexible substrate 407.

Figure 5:
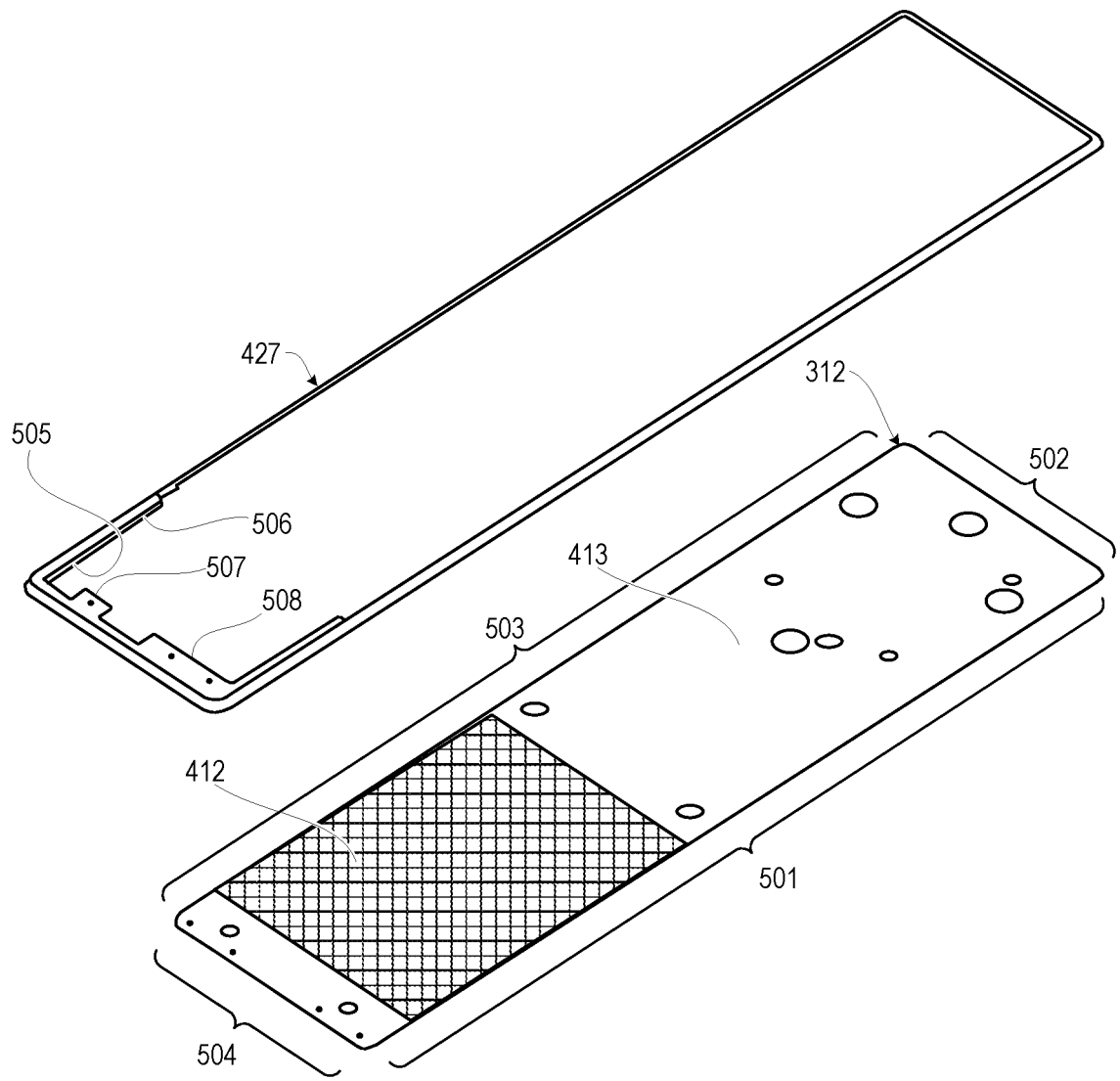
FIG. 5 depicts a blade substrate and a silicone border of the blade assembly in an exploded view, according to one or more embodiments.

FIG. 5 depicts blade substrate 312 and silicone border 427 shown in an exploded view. Silicone border 427 defines a singular, contiguous, unitary piece of silicone. In the illustrative embodiment of FIG. 5, silicone border 427 surrounds three sides 501, 502, and 503 of blade substrate 312, and extends beyond minor side 504 to define receiving recess 505 that can accommodate mechanical and electrical components such as electronic circuit components to provide power and control for flexible display 104 (FIG. 4) that will situate within the perimeter defined by silicone border 427. A tensioner may keep flexible display 104 (FIG. 4) flat across flexible portion 412 of blade substrate 312, flexible circuits, and other components. In one or more embodiments, portions 506, 507, 508 of silicone border 427 extending beyond minor side 504 of blade substrate 312 surrounding receiving recess 505 are thicker than are the other portions of silicone border 427 that will surround flexible display 104 (FIG. 4), enabling components to be placed within receiving recess 505.

Figure 6:
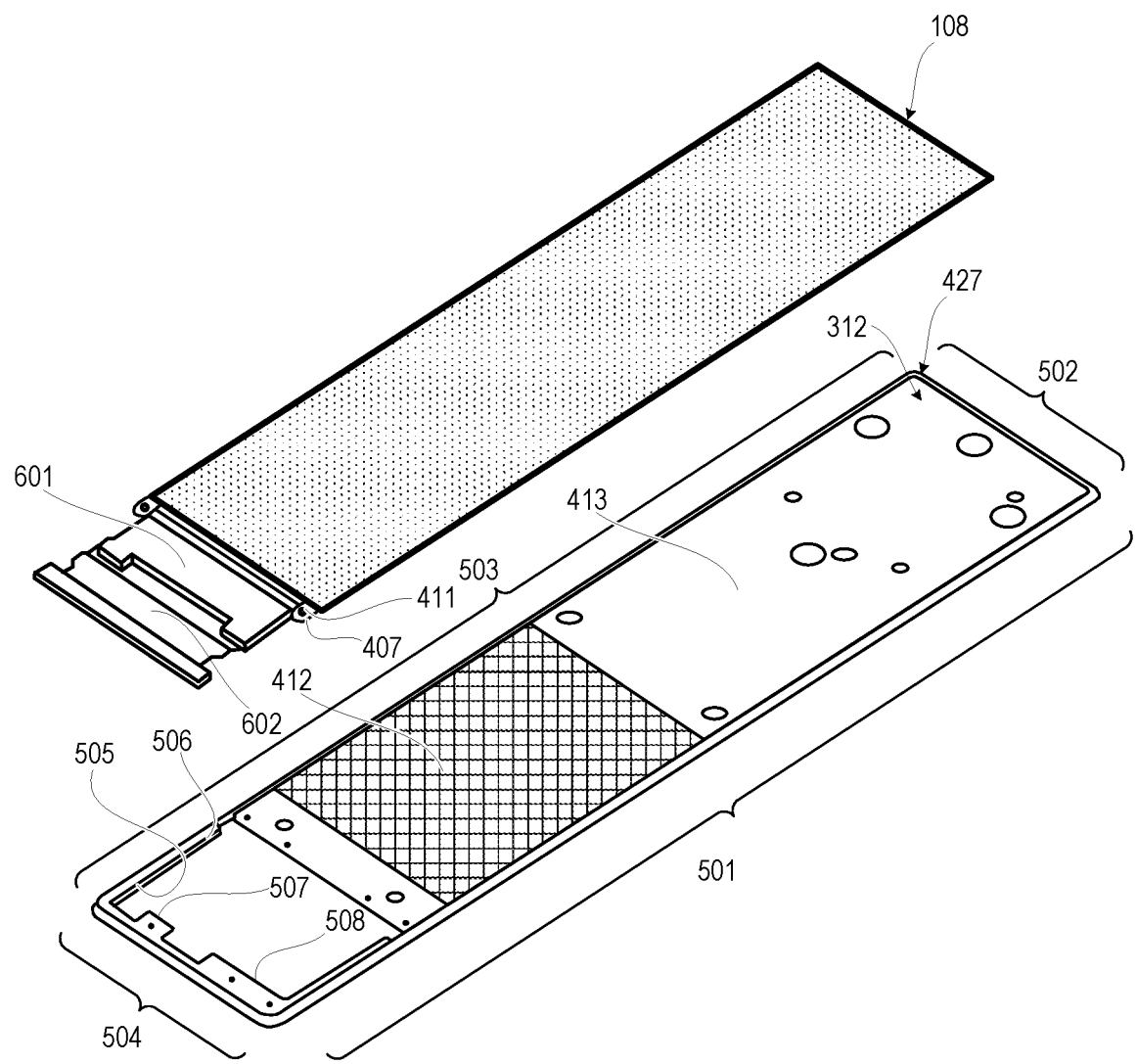
FIG. 6 depicts the flexible display and the blade with silicone border over-molded on the blade substrate in an exploded view, according to one or more embodiments.

FIG. 6 depicts flexible display 104 and blade substrate 312 with silicone border 427 over-molded on blade substrate 312. Silicone border 427 surrounds three sides 501, 502, and 503 of blade substrate 312 and extends beyond minor side 504 to define receiving recess 505 that can accommodate mechanical and electrical components. Electronic circuits 601 that are operable to provide power and control for flexible display 104 have been coupled to T-shaped tongue 410 of flexible display layer 403 (FIG. 4). Additionally, mechanical connector 602 has been connected to the top of the T on T-shaped tongue 410. Flexible substrate 407 extends beyond a distal end of flexible display layer 403 (FIG. 4) so that apertures 411 defined therein can be coupled to a tensioner to ensure that flexible display 104 stays flat around flexible portion 412 of blade substrate 312 when flexible portion 412 of blade substrate 312 passes around a rotor positioned at the end of device housing 108 (FIG. 1).

In one or more embodiments, blade substrate 312 can be fixedly coupled to flexible display 104. In an example, flexible display 104 is coupled to rigid portion 413 by an adhesive or other coupling mechanism. A tensioner can then be positioned in receiving recess 505. In one or more embodiments, the tensioner rigidly couples with fasteners to the apertures 411 (FIG. 4) of flexible substrate 407 (FIG. 4) to keep flexible display 104 flat across flexible portion 412, regardless of how flexible portion 412 is being bent around the minor surface of device housing 108 or a corresponding rotor.

Figure 7:
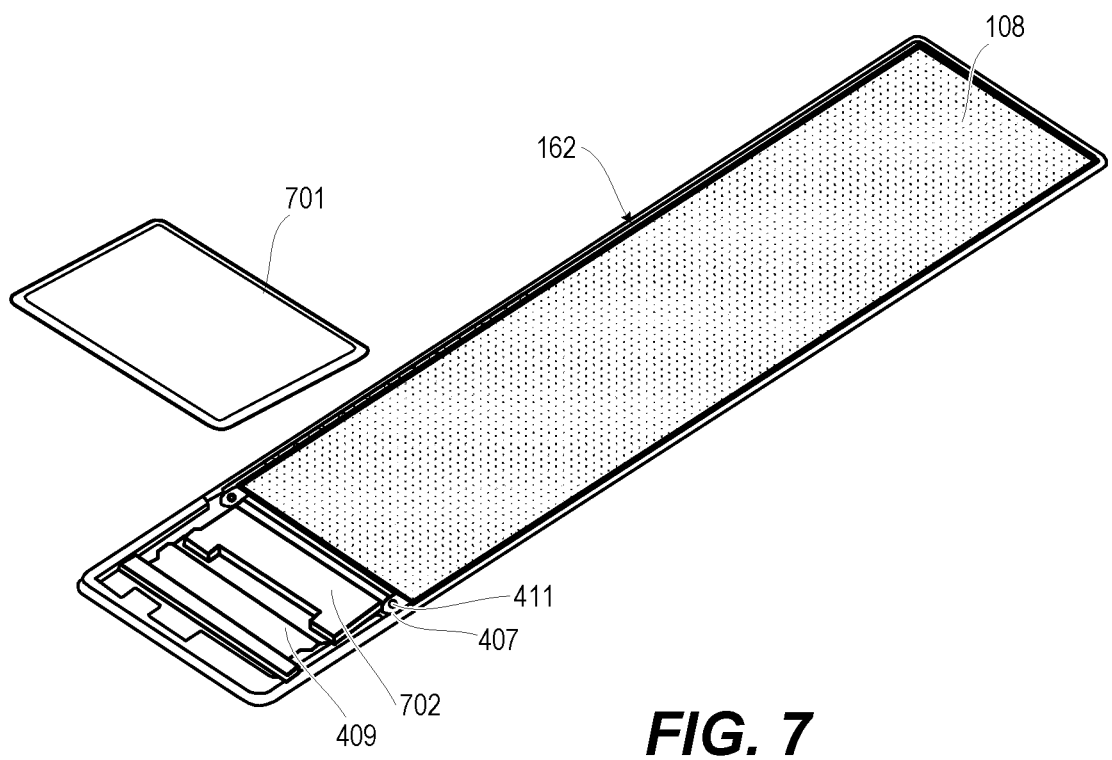
FIG. 7 depicts the flexible display after being coupled to the blade surrounded by a silicone border in an exploded view, according to one or more embodiments.
Figure 8:
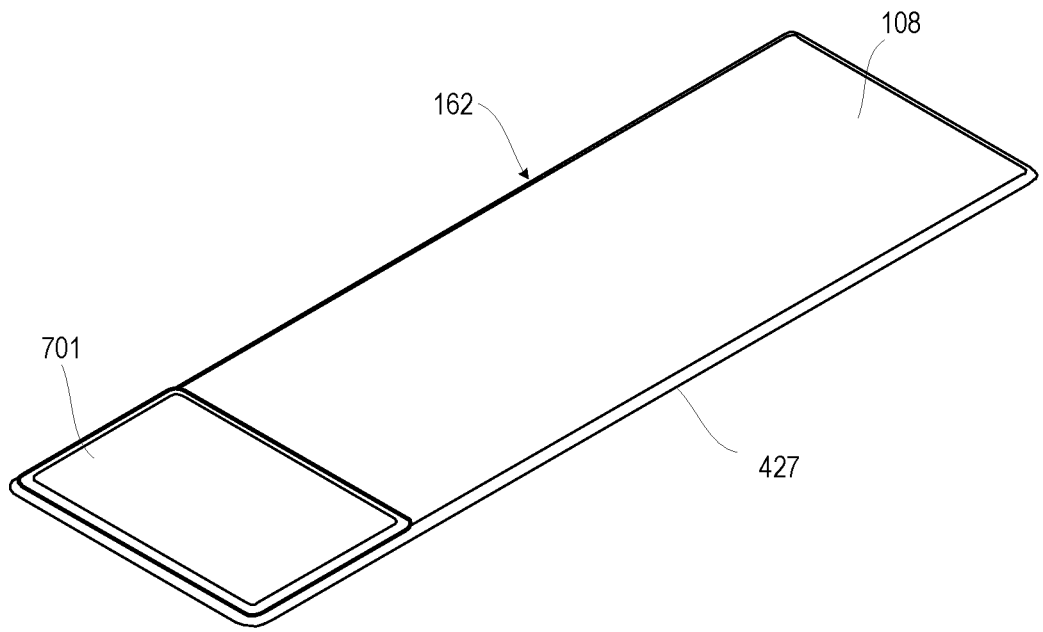
FIG. 8 depicts the blade assembly completely configured with a cover and in an unrolled state in an exploded view, according to one or more embodiments.

FIG. 7 depicts flexible display 104 after being coupled to blade substrate 312. Silicone border 427 surrounds the flexible display 104, with silicone border 427 surrounding and abutting three sides of the flexible display layer (403). A flexible substrate is then connected to the electronic circuits 601 carried by the T-shaped tongue 410. Additionally, a tensioner can be coupled to the flexible substrate 407. Thereafter, cover 701 is attached to silicone border 427 atop the electronic circuits 702 and other components situated on or around the T-shaped tongue 410. This portion of blade assembly 310 where the components are stored beneath cover 701 may be referred to as the "backpack." FIG. 8 depicts blade assembly 310 completely configured with cover 701.

Figure 9:
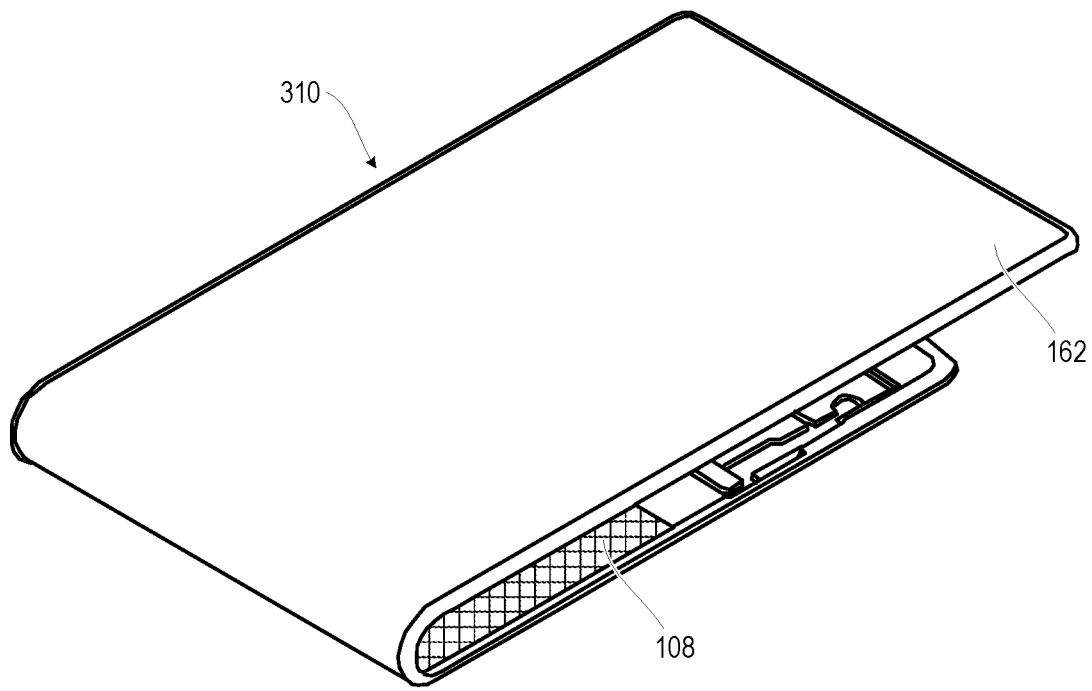
FIG. 9 depicts a three-dimensional view of the blade assembly in a fully retracted state, according to one or more embodiments.
Figure 10:
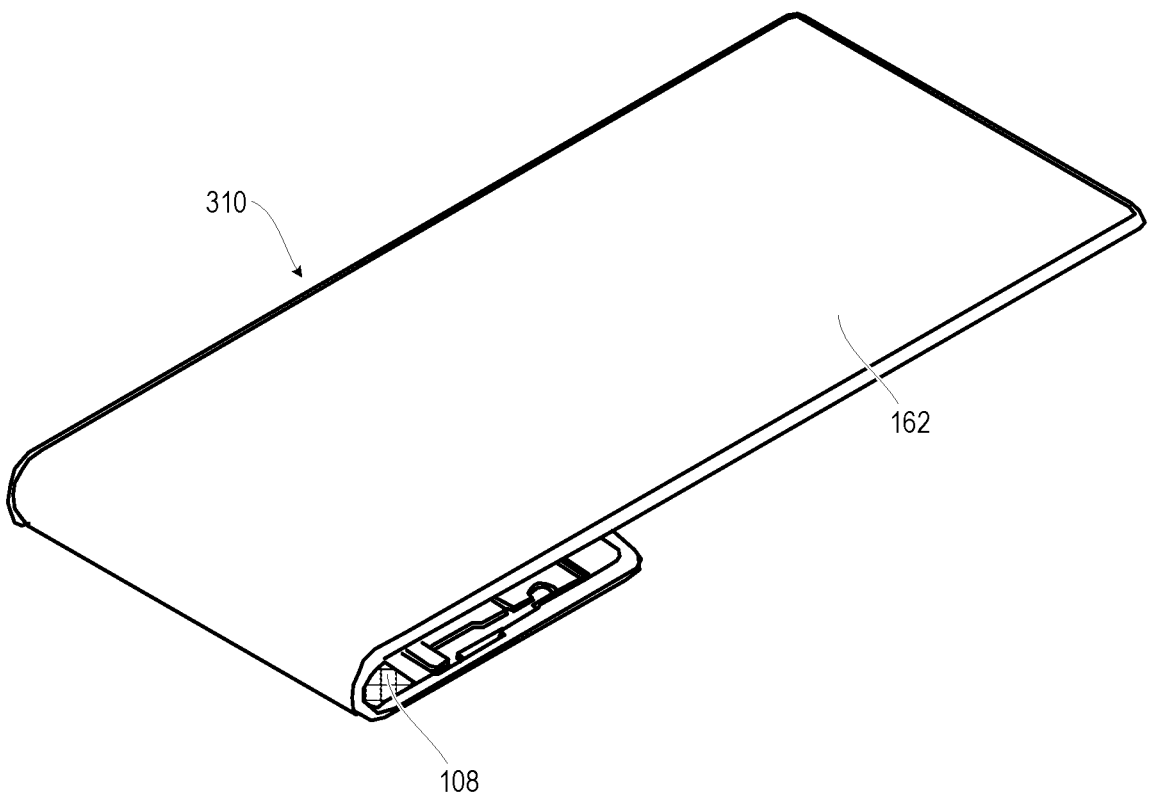
FIG. 10 depicts a three-dimensional view of the blade assembly in a fully extended state, according to one or more embodiments.

FIG. 9 depicts blade assembly 310 in a fully retracted state. FIG. 10 depicts blade assembly 310 in a fully extended state. In one or more embodiments, flexible display 104 and blade substrate 312 are configured to wrap around a minor surface of device housing 108 (FIG. 1) where a display roller mechanism is situated. In one or more embodiments, the display roller mechanism includes a rotor that is positioned within a curvilinear section of flexible display 104 and blade substrate 312. When placed within device housing 108 (FIG. 1), translation of translation mechanism 107 (FIG. 1) causes translation of blade assembly 310, which in turn causes rotation of the rotor. The result is a linear translation of the flexible display 104 and blade substrate 312 across a translation surface of device housing 108 (FIG. 1) by drawing flexible display 104 and the blade substrate 312 around the rotor. As previously described, blade substrate 312 (FIG. 4) of blade assembly 310 includes flexible portion 412 (FIG. 4) that allows blade substrate 312 and flexible display 104 to deform around device housing 108 (FIG. 1), corresponding to the respective points of rolling depicted in FIGS. 9-10.

FIGS. 11A, 11B, and 11C depict communication device 101 of FIG. 1 in front, left, and back views respectively, with rollable display 102a that is in an extended position. Rollable display 102a includes blade assembly 310. The entire length of flexible display 104 is rotated to front side 110a of device housing 108. Blade assembly 310 functions includes blade substrate 312 (FIG. 3) as telescoping structure 106 (FIG. 1) that can extend beyond second edge 115b of device housing 108 to provide front display 116 that is larger (e.g., longer) than device housing 108. With this configuration, back display 117 of FIG. 1 is rotated towards the front of housing to provide extended front display and, as such, back display 117 is no longer available for concurrent front and back display operation.

FIGS. 12A, 12B, and 12C depict an alternate embodiment of communication device 101 of FIG. 1 in front, left, and back views respectively, with rollable display 102b implemented as flexible display 104 presented on device housing 108. First and second telescoping structures 106a-106b (FIG. 12B) of device housing 108 are moved in opposite relative directions to an extended position. Flexible display 104 is rotated to front side 110a of device housing 108, such that back display 117 of FIG. 1 is no longer available for concurrent front and back display operation.

FIGS. 13A, 13B, and 13C depict another alternate embodiment of communication device 101 of FIG. 1 in front, left, and back views respectively, with rollable display 102c implemented as flexible display 104 presented on telescoping structures 106a-106b (FIG. 14B) of device housing 108a that is in a retracted position. Flexible display 104*b* covers all of front side 110*a* and covers top and bottom of back side 110*b* of device housing 108*a*. Front image capturing device 112*a* is implemented as camera under display. Back image capturing device 112*b* is implemented in a cover 1301 on back side 110*b* of device housing 108*a*. Front display 116, first back display 117*a*, and second back display 117*b* (FIG. 13C) are available for concurrent front and back display operation.

FIGS. 14A, 14B, and 14C depict communication device 101 of FIGS. 13A-13B in front, left, and back views respectively, with rollable display 102*c* in an extended position. First and second telescoping structures 106*a*-106*b* (FIG. 14B) of device housing 108*a* are moved in opposite relative directions from base structure 106*c* to an extended position. Flexible display 104 is rotated to front side 110*a* of device housing 108*a*. With this extended device configuration, first and second back displays 117*a*-117*b* of FIG. 13C are no longer available for concurrent front and back display operation.

Figure 15A:
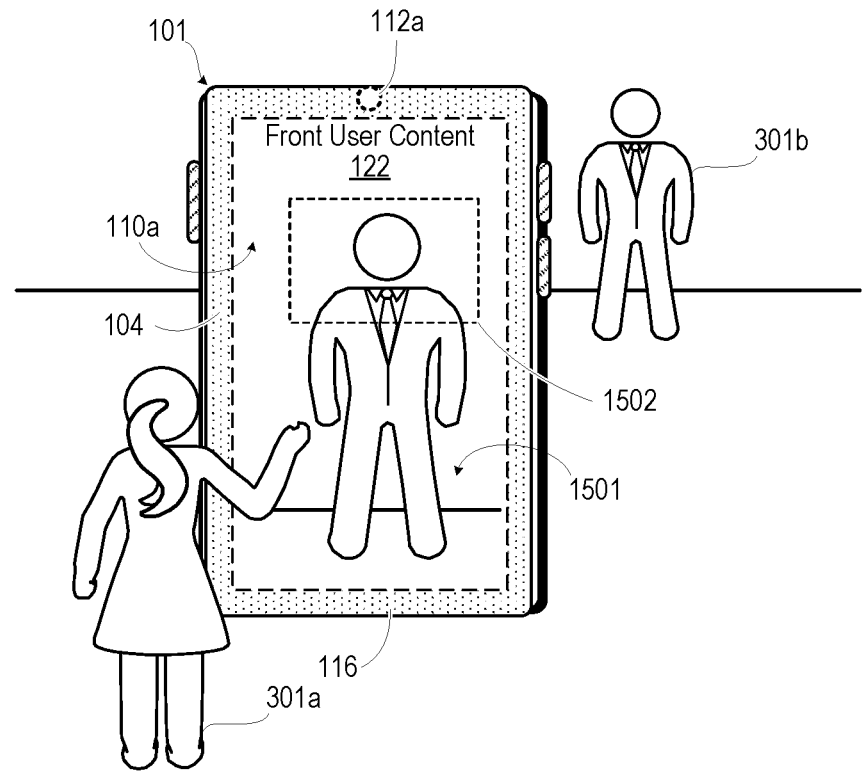
FIG. 15A is a front side view of the communication device in front and back display operation for a photographer-photographed subject scenario between front and back users, according to one or more embodiments.
Figure 15B:
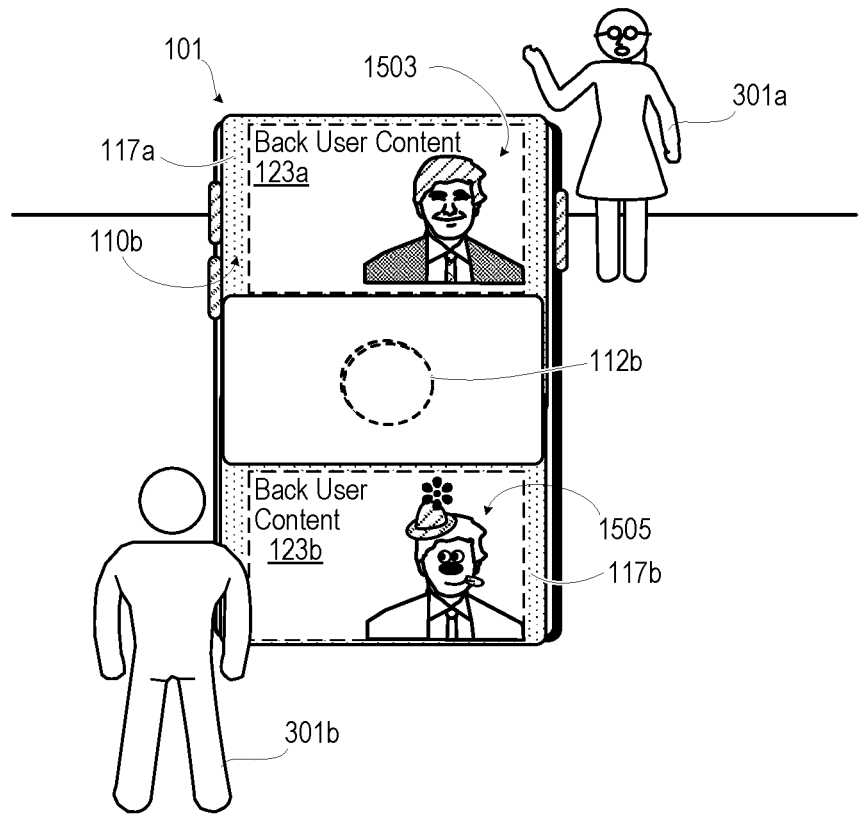
FIG. 15B is a back side view of the communication device in front and back display operation for the photographer-photographed subject scenario, according to one or more embodiments.

FIGS. 15A-15B are front and back views of communication device 101 in concurrent front and back display operation for a photographer-photographed subject scenario between front user 301*a*, who is acting as a photographer, and back user 301*b*, who is acting as photographed subject. In FIG. 15A, front display 116 presents front user content 122 such as raw preview 1501 of camera image of photographed subject (back user 301*b*). Camera controls 1502 may be presented enabling photographer (front user 301*a*) to adjust front user content 123 and to create other renderings. In an example, in FIG. 15B, first back display 117*a* presents a close up view 1503 to prompt photographed subject (back user 301*b*) to center himself/herself within back field of view 113*b* (FIG. 1) and to be able to see their current facial expression. Second back display 117*b* presents a modified rendering 1505 of the preview camera view to distort the image or to add cartoon annotations to prompt a smile or gain the attention of photographed subject (back user 301*b*).

Figure 16A:
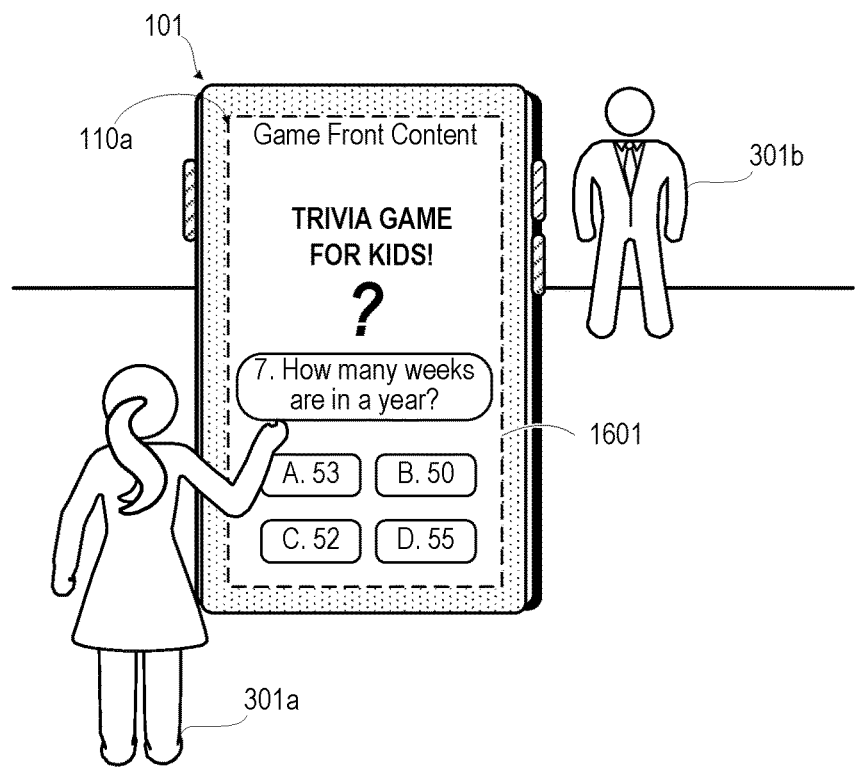
FIG. 16A is a front side view of the communication device in front and back display operation for a game scenario between front and back users, according to one or more embodiments.
Figure 16B:
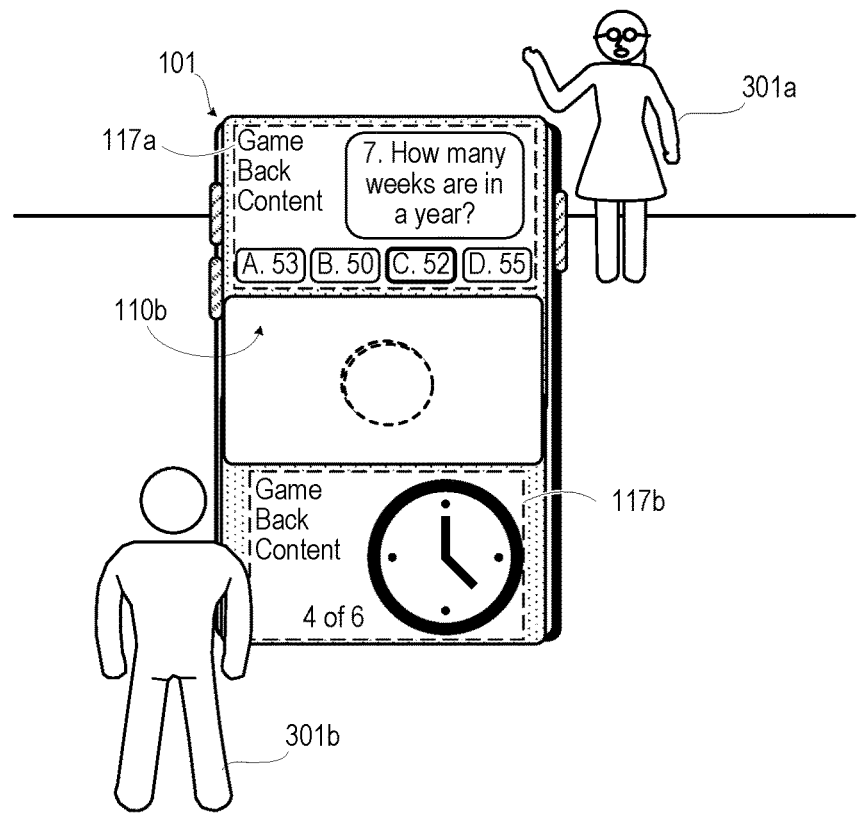
FIG. 16B is a back side view of the communication device in front and back display operation for the game scenario, according to one or more embodiments.

FIGS. 16A-16B are a front and back views of communication device 101 in front and back display operation for a game scenario involving front and back users 301*a*-301*b*. Front and back user content 122-123 from a shared game are presented respectively on front and back displays 116-117 that are rendered differently as appropriate for a current role of each respective user in the game. In an example, in FIG. 16A, front user 301*a* is presented a trivia question 1601 for the role of having to answer the trivia question 1601. Communication device 101 may detect a correct or incorrect answer from front user based on voice or gesture recognition by front camera and game controller may automatically change to a next question. In FIG. 16B, first back display 117*a* concurrently presents the current question and the answer to back user 301*b* to enhance the role of observing the game play by the front user 301*a*. Second back display 117*b* presents the current score and time remaining to back user 301*b*. When roles switch during the next question, front and back user content 122-123 changes to reflect the switched roles.

Figure 17A:
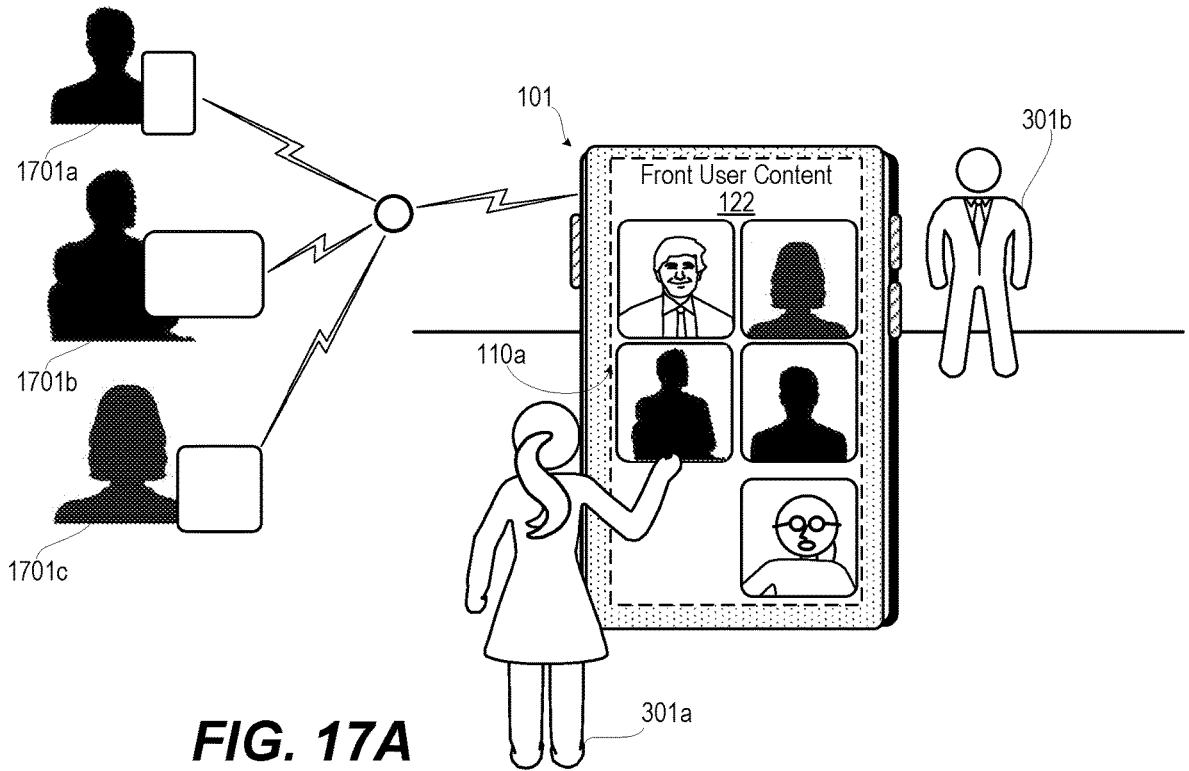
FIG. 17A is a front side view of the communication device in front and back display operation for a video communication session between front and back users and remote users, according to one or more embodiments.
Figure 17B:
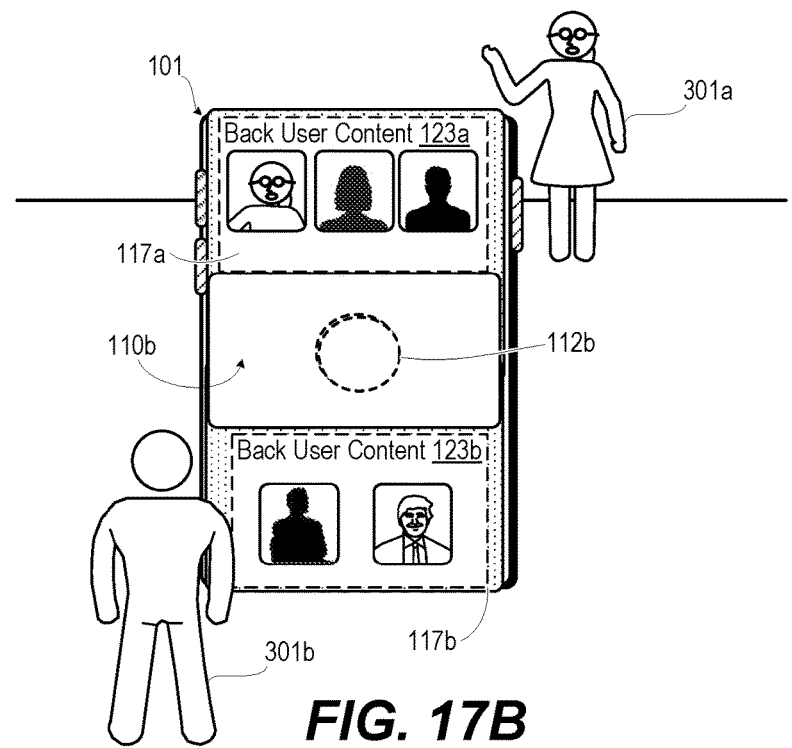
FIG. 17B is a back side view of the communication device in front and back display operation for the video communication session, according to one or more embodiments.

FIGS. 17A-17B are front and back views of communication device 101 in front and back display operation for a video communication session between front and back users 301*a*-301*b* and remote users 1701*a*, 1701*b*, and 1701*c*. In FIG. 17A, front user content 122 is rendered on front display 116 as appropriate to a self-view of front user 301*a* and views of other participants in a communication session. In an example, the self-view of first user 301*a* is always on screen and reversed. In FIG. 17B, back user content 123*a*-123*b* is rendered in first and second back displays 117*a*-117*b* as appropriate to a self-view of back user 301*b* and views of other participants in the communication session. In an example, back user 301*b* self-view is always on screen and reversed. In another example, the number of participant videos presented on first and second back displays 117*a*-117*b* may be reduced to correspond to the reduced display area as compared to front display 116 (FIG. 17A).

In an example, back user content 123 (FIGS. 15B, 16B, and 17B) is displayed on two back displays (i.e., first and second back displays 117*a*-117*b*). In other embodiments, instead of the embodiment of communication device 101 depicted in FIGS. 13A-13C and FIGS. 15A-15B, back user content 123 may be presented on one back display 117 (FIG. 1).

Figure 18:
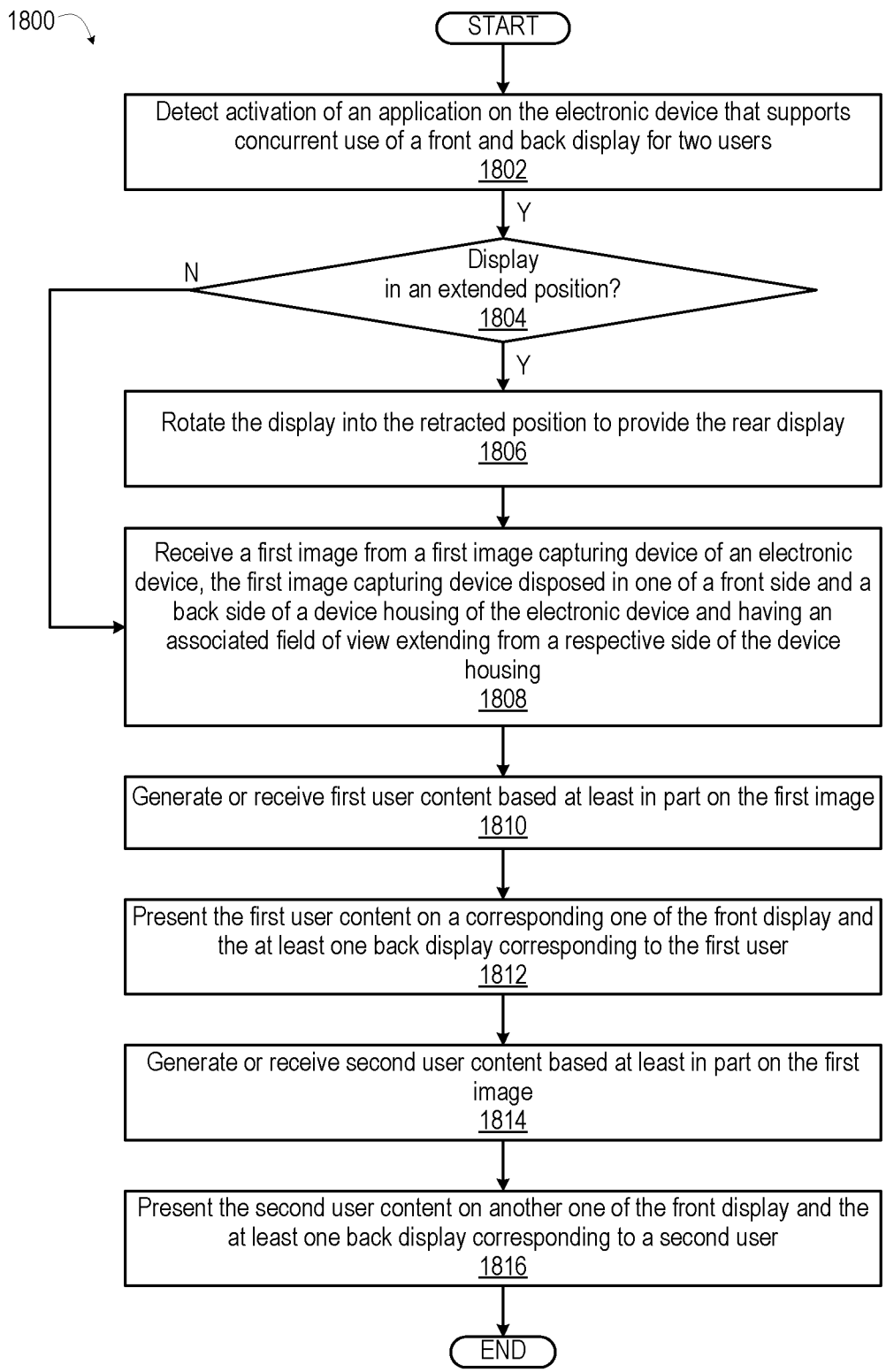
FIG. 18 is a flow diagram of a method of separately managing front and back display operation of a rollable display in a retracted position, according to one or more embodiments.
Figure 19A:
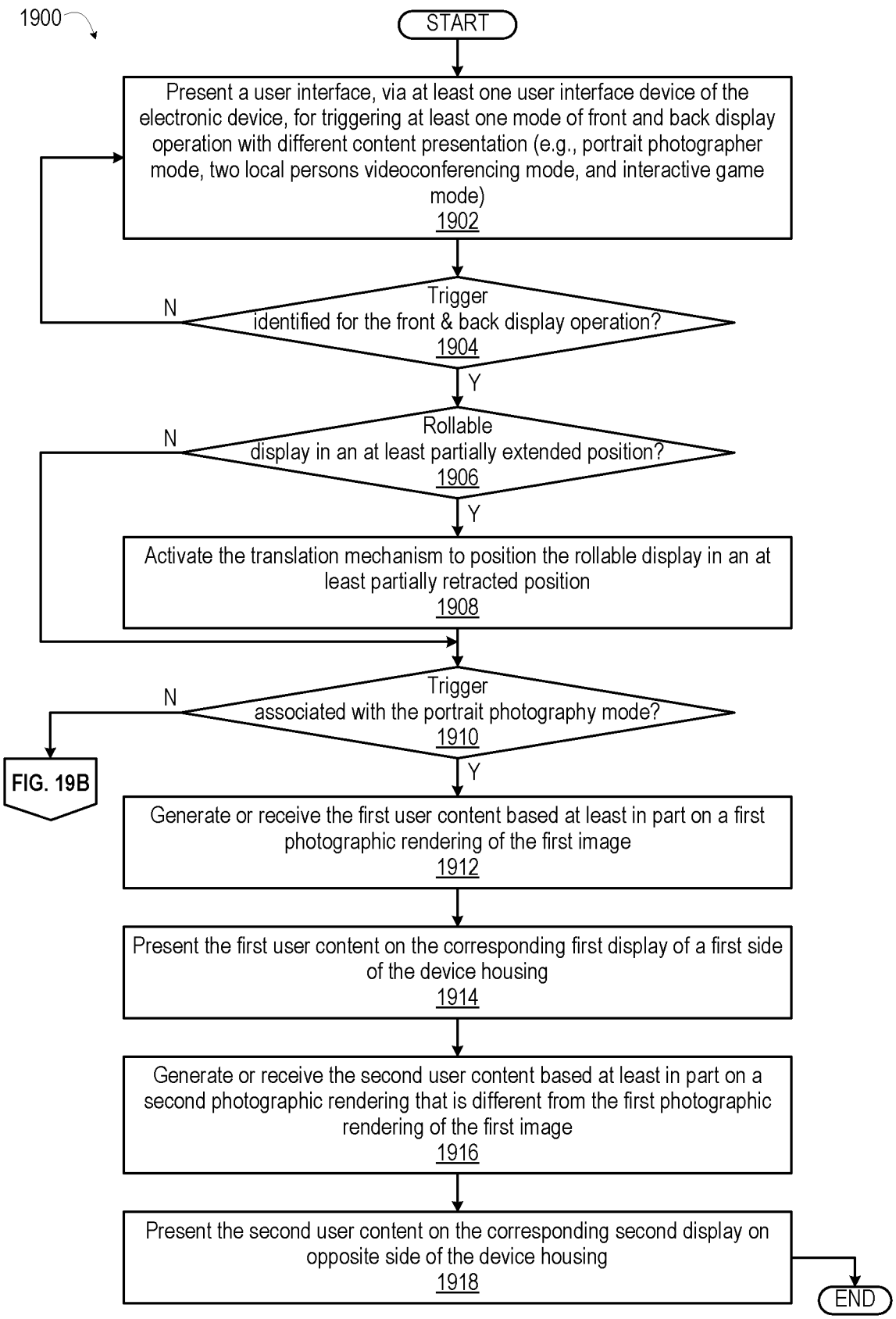
FIGS. 19A-19C (collectively "FIG. 19") are a flow diagram presenting a method of performing three particular use cases of separately managing front and back display operation, according to one or more embodiments.
Figure 19B:
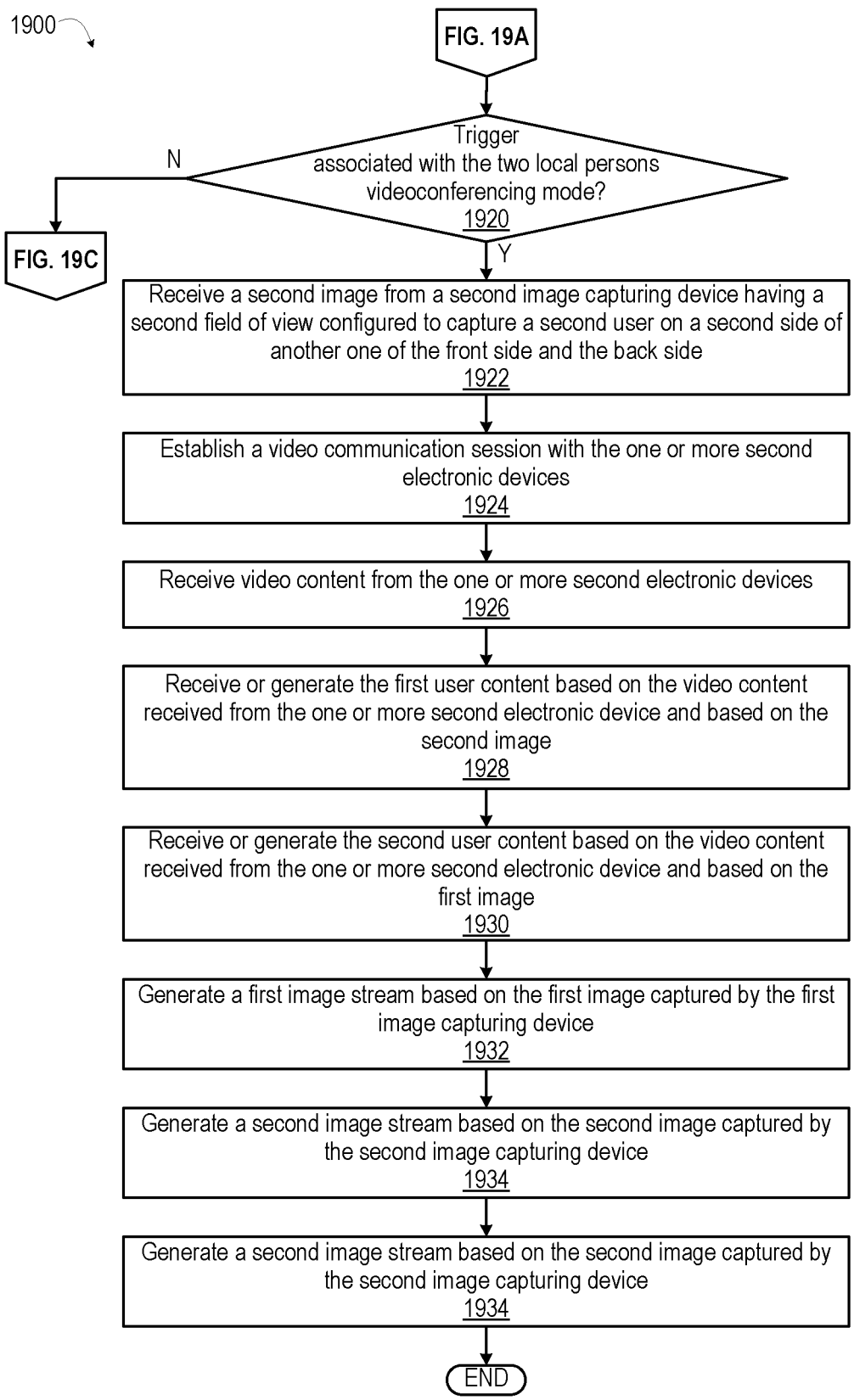
Figure 19C:
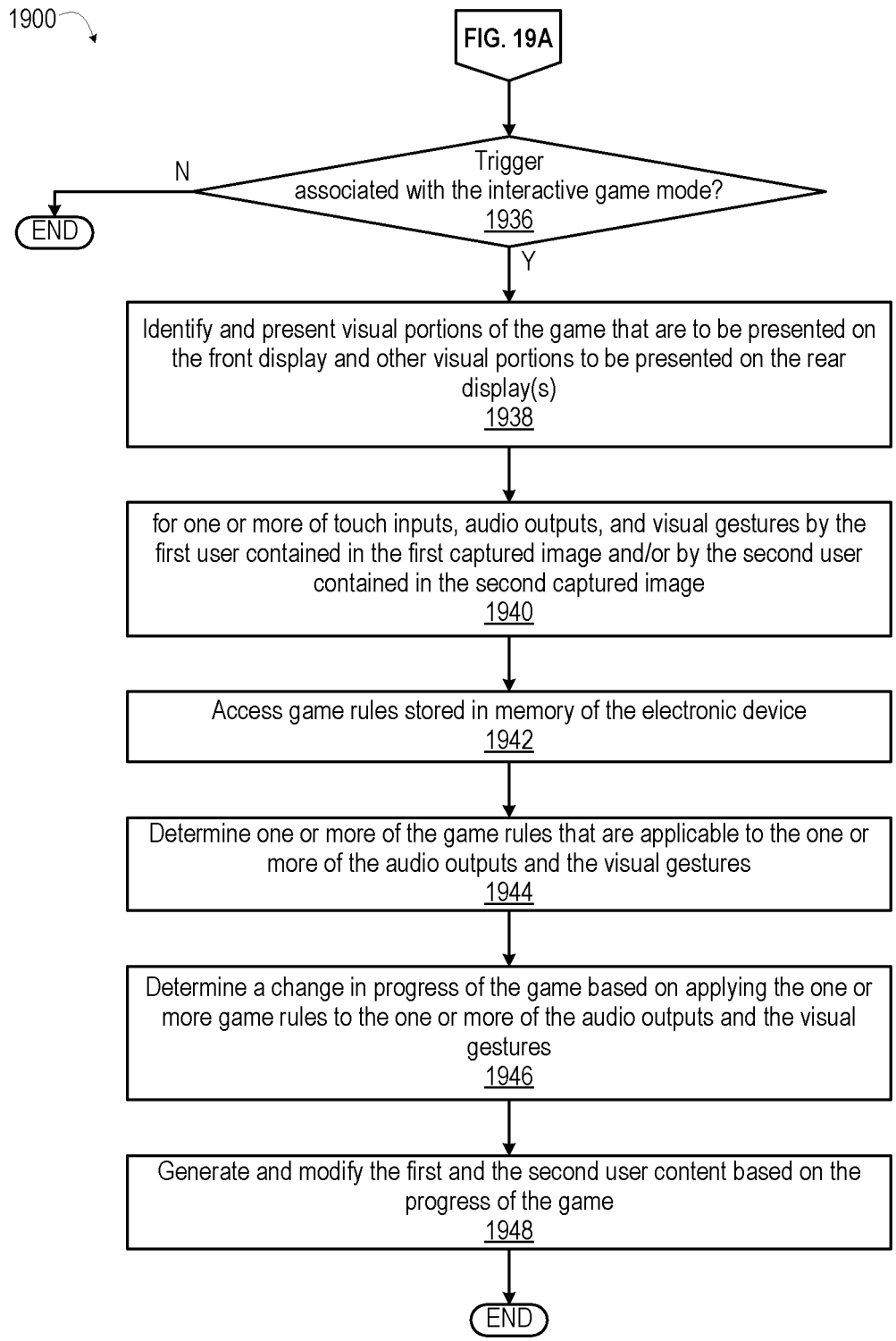

FIG. 18 is a flow diagram of a method of separately managing front and back display operation of a rollable display in a retracted position. FIGS. 19A-19C (collectively "FIG. 19") are a flow diagram presenting a method of performing three particular use cases of separately managing front and back display operation. The descriptions of method 1800 (FIG. 18) and method 1900 (FIG. 19) are provided with general reference to the specific components illustrated within the preceding FIGS. 1-10, 11A-11C, 12A-12C, 13A-13C, 14A-14C, 15A-15B, 16A-16B, and 17A-17B. Specific components referenced in method 1800 (FIG. 18) and method 1900 (FIG. 19) may be identical or similar to components of the same name used in describing preceding FIGS. 1-10, 11A-11C, 12A-12C, 13A-13C, 14A-14C, 15A-15B, 16A-16B, and 17A-17B. In one or more embodiments, controller 120 (FIGS. 1-2) configures communication device 101 (FIGS. 1-2) to provide the described functionality of method 1800 (FIG. 18) and method 1900 (FIG. 19).

With reference to FIG. 18, one aspect of method 1800 includes operating a translation mechanism to slide a rollable display relative to a device housing of an electronic device between a fully retracted position and a fully extended position. The rollable display is rollable over at least one edge of the device housing to provide a front display on the front side and at least one back display on the back side. In one or more embodiments, the rollable display includes a blade assembly having a blade slidably coupled to the device housing and having a flexible display attached to the blade. The rollable display is configured to roll around one end of the device housing and to extend beyond another end of the device housing. In one or more embodiments, the rollable display is rollable over opposite first and second edges of the device housing to provide a front display on the front side and two back displays on the back side while in an at least partially retracted position. The device housing includes a telescoping structure that shortens in the fully retracted position and lengthens in the fully extended position. Operating the translation mechanism slides the rollable display relative to the device housing between a fully retracted position and a fully extended position by positioning the telescoping structure. At block 1802, method 1800 includes detecting activation of an application on the electronic device that supports concurrent use of both a front and back display for two users. Method 1800 includes determining whether the display is in the extended position (decision block 1804). In response to determining that the display being in the extended position, method 1800 includes rotating the display into a retracted position to provide the rear display (block 1806). In response to determining that the display is not in the extended position (i.e., is already in the retracted position) or after block 1806), method 1800 includes receiving a first image from a first image capturing device of an electronic device, the first image capturing device disposed in one of a front side and a back side of a device housing of the electronic device and having an associated field of view extending from a respective side of the device housing (block 1808). Method 1800 includes generating first user content based at least in part on the first image (block 1810). Method 1800 includes presenting the first user content on a corresponding one of the front display and the at least one back display corresponding to the first user (block 1812). Method 1800 includes generating second user content based at least in part on the first image (block 1814). Method 1800 includes presenting the second user content on another one of the front display and the at least one back display corresponding to a position of the second user to view the second user content (block 1816). Then method 1800 ends.

With reference to FIG. 19A, method 1900 includes presenting a user interface, via at least one user interface device of the electronic device, for triggering at least one mode of front and back display operation with different content presentation (e.g., portrait photographer mode, two local persons videoconferencing mode, and interactive game mode) (block 1902). Method 1900 includes determining whether a trigger is identified for the front and back display operation (decision block 1904). In response to determining that the trigger is not identified for the front and back display operation, method 1900 returns to block 1902. In response to determining that the trigger is identified for the front and back display operation, method 1900 may include determining whether the rollable display is in an at least partially extended position (decision block 1906). The at least partially extended position leaves an insufficient portion of the flexible display rolled onto the back side of the device housing to enable front and back display operation. Conversely, the at least partially retracted position has a sufficient portion of the flexible display rolled onto the back side of the device housing to enable the front and back display operation. In response to determining that the rollable display is in the at least partially extended position, method 1900 may include activating the translation mechanism to position the rollable display in an at least partially retracted position sufficient to enable use of the back display for presenting content to support the dual display operation (block 1908).

In response to determining that the rollable display is not in the at least partially extended position (i.e., is in the at least partially retracted position) in decision block 1906 or after block 1908, method 1900 may include determining/identifying whether the trigger is associated with the portrait photography mode (decision block 1910). In response to determining that the trigger is associated with the portrait photography mode, method 1900 includes generating the first user content based at least in part on a first photographic rendering of a first image captured by a first image capturing device (block 1912). Method 1900 includes presenting the first user content on the corresponding first display of a first side of the device housing (block 1914). Method 1900 includes generating the second user content based at least in part on a second photographic rendering that is different from the first photographic rendering of the first image (block 1916). Method 1900 includes presenting the second user content on the second display on the opposite side of the device housing (block 1918). The first photographic rendering is content suitable for a photographer attempting to capture a photograph or video of a subject. The second photographic rendering is content suitable for the photographed subject to be guided toward providing a suitable position, pose and expression for being photographed or video recorded. Then method 1900 ends.

In response to determining that the trigger is not associated with the portrait photography mode in decision block 1910, method 1900 proceeds to block 1920 of FIG. 19B. With reference to FIG. 19B, method 1900 includes determining whether the trigger is associated with the two local persons videoconferencing mode (decision block 1920). In response to determining that the trigger is not associated with the two local persons videoconferencing mode, method 1900 proceeds to block 1936 of FIG. 19C. In response to determining that the trigger is associated with the two local persons videoconferencing mode, method 1900 includes receiving a second image from a second image capturing device having a second field of view configured to capture a second user on a second side of another one of the front side and the back side (block 1922). Method 1900 includes establishing a video communication session with the one or more second electronic devices (block 1924). Method 1900 includes receiving video content from the one or more second electronic devices (block 1926). Method 1900 includes generating the first user content based on the video content received from the one or more second electronic device and based on the second image (block 1928). Method 1900 includes generating the second user content based on the video content received from the one or more second electronic device and based on the first image (block 1930). Method 1900 includes generating a first image stream based on the first image captured by the first image capturing device (block 1932). Method 1900 includes generating a second image stream based on the second image captured by the second image capturing device (block 1934). Method 1900 includes communicating the first and the second image streams to the video communication session for presenting by the one or more second electronic devices (block 1936). Then method 1900 ends.

In one or more embodiments, method 1900 may further include generating the front display content based on one or more of the remote display content, the front image, and the back image. Method 1900 may further include generating the back display image based on one or more of the remote display content, the front image; and the back image. In one or more particular embodiments, method 1900 may further include selecting concurrently presented ones of the remote display content, the front image, and the back image presented as the front display content for the back display content based on available display space on the at least one back display.

With reference to FIG. 19C, in response to determining that the trigger is not associated with the two local persons videoconferencing mode in decision block 1916 (FIG. 19B), method 1900 includes determining whether the trigger is associated with the interactive game mode (decision block 1936). In response to determining the trigger is not associated with the interactive game mode, method 1900 ends. For clarity, three examples of concurrent front and back display operation are described for method 1900. The three examples are not intended to be all inconclusive. In general, aspects of the present disclosure enable presentation of content on both front and back displays based on images captured by at least one image capturing device.

In response to determining the trigger is associated with the interactive game mode, method 1900 includes identifying and presenting visual portions of the game that are to be presented on the front display and other visual portions to be presented on the rear display(s) (block 1938). Method 1900 includes monitoring for one or more of touch inputs, audio outputs, and visual gestures by the first user contained in the first captured image and/or by the second user contained in the second captured image (block 1940). Method 1900 includes accessing game rules stored in memory of the electronic device (block 1942). Method 1900 includes determining one or more of the game rules that are applicable to the one or more of the audio outputs and the visual gestures (block 1944). Method 1900 includes determining a change in progress of the game based on applying the one or more game rules to the one or more of the audio outputs and the visual gestures (block 1946). Method 1900 includes generating and modifying the first and the second user content based on the progress of the game (block 1948). In an example, method 1900 may include updating scores for the game, presenting information indicating whose has the next turn in the game, and presenting information of what the next player is supposed to do during the new turn. Then method 1900 ends.

In one or more embodiments, the trigger for the front and back display operating mode includes activation of a multiparty game facilitated by the electronic device presenting respective game content in both the front and back display. One of the front user and the back user is a designated participant performing a turn in the multiparty game being captured in the at least one first image. Another of the front user and the back user is a witnessing participant in the multiparty game. Method 1900 may further include identifying the activation of the multiparty game. Method 1900 includes monitoring one or more of audio outputs, received by a microphone, and visual gestures, contained in the at least one first image, by the first user. Method 1900 may further include applying game rules to the one or more of the audio outputs and the visual gestures. Method 1900 may further include generating, based on the game rules, one of the front and the back display content respectively viewable by the designated participant and by the witnessing participant.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a device housing having a front side and a back side opposed to the front side;
   at least one first image capturing device disposed in one of the front side or the back side of the device housing and having a first field of view extending from a corresponding side of the device housing;
   a rollable display rollable over at least one edge of the device housing to provide a front display on the front side and at least one back display on the back side;
   a translation mechanism operable to slide the rollable display relative to the device housing between a fully retracted position and a fully extended position; and
   a controller communicatively coupled to the at least one first image capturing device, the rollable display, and the translation mechanism, and which:
      in response to identifying a trigger for a front and back display operating mode to concurrently support use of the front display for interfacing by a first user positioned to view the front side of the rollable display and use of the at least one back display for interfacing by a back user positioned to view the back side of the rollable display:
         receives at least one first image from one of the at least one first image capturing devices;
         generates front display content based at least in part on the at least one first image;
         presents the front display content on the front display;

generates back display content related to, and different from, the front display content;

in response to determining that front and back display operation is triggered while the rollable display is in an at least partially extended position, activates the translation mechanism to position the rollable display in an at least partially retracted position to present the at least one back display on the back side of the electronic device; and presents the back display content on the at least one back display.

2. The electronic device of claim 1, wherein:
the rollable display comprises a blade assembly having a blade slidably coupled to the device housing and having a flexible display attached to the blade, the rollable display configured to roll around one end of the device housing and to extend beyond another end of the device housing; and
the translation mechanism is operable to slide the blade assembly relative to the device housing between a fully retracted position and a fully extended position by rolling the blade around the one end.

3. The electronic device of claim 1, wherein:
the rollable display is rollable over opposite first and second edges of the device housing to provide a front display on the front side and two back displays on the back side while in an at least partially retracted position;
the device housing comprises a telescoping structure that shortens in the fully retracted position and lengthens in the fully extended position; and
the translation mechanism is operable to slide the rollable display relative to the device housing between a fully retracted position and a fully extended position by positioning the telescoping structure.

4. The electronic device of claim 1, wherein the trigger for the front and back display operating mode comprises activation of a posed photography session with one of a front user and a back user being a subject captured in the at least one first image and another of the front user and the back user being an operator of the electronic device to capture the at least one first image; and
wherein the controller:
identifies the trigger for the front and back display operating mode;
presents first display content comprising a first photographic rendering of an image preview of a corresponding one of the at least one front and back image capturing devices that captures the subject in the at least one first image; and
presents second display content comprising a second photographic rendering of the image preview that is different from the first photographic rendering and is configured to prompt at least one of positioning or attentiveness by the subject.

5. The electronic device of claim 1, further comprising a microphone communicatively coupled to the controller, and wherein:
the trigger for the front and back display operating mode comprises activation of a multiparty game facilitated by the electronic device presenting respective game content in both the front and back display, with one of the front user and the back user being a designated participant performing a turn in the multiparty game being captured in the at least one first image and another of the front user and the back user being a witnessing participant in the multiparty game; and the controller:
identifies the activation of the multiparty game;
monitors one or more of audio outputs, received by the microphone, and visual gestures, contained in the at least one first image, by the first user;
applies game rules to the one or more of the audio outputs and the visual gestures; and
generates, based on the game rules, one of the front and the back display content respectively viewable by the designated participant and by the witnessing participant.

6. The electronic device of claim 1, wherein the at least one first image capturing device comprises at least one front image capturing device disposed in the front side of the device housing and having a front field of view extending from the front side of the device housing, the electronic device further comprising:
at least one back image capturing device disposed in the back side of the device housing and having a back field of view extending from the back side of the device housing;
a communications subsystem communicatively connected to the controller and communicatively connectable via a network to one or more second electronic devices, wherein:
the trigger for the front and back display operating mode comprises establishment of a multiparty video communication session including the front user and the back user and one or more second electronic devices; and
the controller:
receives remote display content from the one or more second electronic devices;
receives, from the at least one front image capturing device, at least one first image comprising a front image, capturing a front field of view including at least partially the front user;
receives, from the at least one back image capturing device, at least one back image comprising a back image, capturing a back field of view including at least partially the back user;
presents at least the remote display content on each of the front and the back displays; and
communicates the front and back images, via the communications subsystem, as separate images to the video communication session.

7. The electronic device of claim 6, wherein the controller:
generates the front display content based on one or more of the remote display content, the front image, and the back image; and
generates the back display image based on one or more of the remote display content, the front image; and the back image.

8. The electronic device of claim 7, wherein the controller selects concurrently presented ones of the remote display content, the front image, and the back image presented as the front display content for the back display content based on available display space on the at least one back display.

9. A method comprising:
monitoring at least one first image capturing device disposed in one of a front side or a back side of a device housing of an electronic device and having a first field of view extending from a corresponding side of the device housing, the electronic device comprising a rollable display capable of being positioned to provide a front and at least one back display; and identifying a trigger for a front and back display operating mode to concurrently support use of a front display for interfacing by a first user positioned to view the front side of a rollable display and use of at least one back display for interfacing by a back user positioned to view the back side of the rollable display;

in response to determining that front and back display operation is triggered while the rollable display is in an at least partially extended position, activating a translation mechanism to position the rollable display in an at least partially retracted position to present the at least one back display on the back side of the electronic device;

receiving at least one first image from one of the at least one first image capturing device;

generating front display content based at least in part on the at least one first image;

presenting the front display content on the front display;

generating back display content related to, and different from, the front display content; and presenting the back display content on the at least one back display.

10. The method of claim 9, wherein the rollable display comprises a blade assembly having a blade slidably coupled to the device housing and having a flexible display attached to the blade, the rollable display configured to roll around one end of the device housing and to extend beyond another end of the device housing, and the method further comprises operating a translation mechanism to slide the blade assembly relative to the device housing between a fully retracted position and a fully extended position by rolling the blade around the one end.

11. The method of claim 9, wherein:
the rollable display is rollable over opposite first and second edges of the device housing to provide a front display on the front side and two back displays on the back side while in an at least partially retracted position; and
the device housing comprises a telescoping structure that shortens in a fully retracted position and lengthens in a fully extended position; and wherein operating a translation mechanism to slide the rollable display relative to the device housing between a fully retracted position and a fully extended position by positioning the telescoping structure.

12. The method of claim 9, wherein the trigger for the front and back display operating mode comprises activation of a posed photography session with one of a front user and a back user being a subject captured in the at least one first image and another of the front user and the back user being an operator of the electronic device to capture the at least one first image; and the method further comprises:
identifying the trigger for the front and back display operating mode;
presenting first display content comprising a first photographic rendering of an image preview of a corresponding one of the at least one front and back image capturing devices that captures the subject in the at least one first image; and
presenting second display content comprising a second photographic rendering of the image preview that is different from the first photographic rendering and is configured to prompt at least one of positioning or attentiveness by the subject.

13. The method of claim 9, wherein the trigger for the front and back display operating mode comprises activation of a multiparty game facilitated by the electronic device presenting respective game content in both the front and back display, with one of the front user and the back user being a designated participant performing a turn in the multiparty game being captured in the at least one first image and another of the front user and the back user being a witnessing participant in the multiparty game; and the method further comprises:
identifying the activation of the multiparty game;
monitoring one or more of audio outputs, received by a microphone, and visual gestures, contained in the at least one first image, by the first user;
applying game rules to the one or more of the audio outputs and the visual gestures; and
generating, based on the game rules, one of the front and the back display content respectively viewable by the designated participant and by the witnessing participant.

14. The method of claim 9, wherein:
the at least one first image capturing device comprises at least one front image capturing device disposed in the front side of the device housing and having a front field of view extending from the front side of the device housing;
the trigger for the front and back display operating mode comprises establishment of a multiparty video communication session including the front user and the back user and one or more second electronic devices; and the method further comprises:
monitoring at least one back image capturing device disposed in the back side of the device housing and having a back field of view extending from the back side of the device housing;
receiving, via a communications subsystem of the electronic device, remote display content from one or more second electronic devices;
receiving, from the at least one front image capturing device, at least one first image comprising a front image, capturing a front field of view including at least partially the front user;
receiving, from the at least one back image capturing device, at least one back image comprising a back image, capturing a back field of view including at least partially the back user;
presents at least the remote display content on each of the front and the back displays; and
communicates the front and back images, via the communications subsystem, as separate images to the video communication session.

15. The method of claim 14, further comprising:
generating the front display content based on one or more of the remote display content, the front image, and the back image; and
generating the back display image based on one or more of the remote display content, the front image; and the back image.

16. The method of claim 15, further comprising selecting concurrently presented ones of the remote display content, the front image, and the back image presented as the front display content for the back display content based on available display space on the at least one back display.

17. A computer program product comprising:
a non-transitory computer readable storage device; and
program code on the computer readable storage device that when executed by a processor associated with an electronic device, the program code enables the electronic device to provide functionality of:

monitoring at least one first image capturing device disposed in one of a front side or a back side of a device housing of the electronic device and having a first field of view extending from a corresponding side of the device housing, the electronic device comprising a rollable display capable of being positioned to provide a front and at least one back display; and identifying a trigger for a front and back display operating mode to concurrently support use of a front display for interfacing by a first user positioned to view the front side of a rollable display and use of at least one back display for interfacing by a back user positioned to view the back side of the rollable display;

in response to determining that front and back display operation is triggered while the rollable display is in an at least partially extended position, activating a translation mechanism to position the rollable display in an at least partially retracted position to present the at least one back display on the back side of the electronic device;

receiving at least one first image from one of the at least one first image capturing device;

generating front display content based at least in part on the at least one first image;

presenting the front display content on the front display;

generating back display content related to, and different from, the front display content; and presenting the back display content on the at least one back display.

18. The computer program product of claim 17, wherein:

the rollable display comprises a blade assembly having a blade slidably coupled to the device housing and having a flexible display attached to the blade, the rollable display configured to roll around one end of the device housing and to extend beyond another end of the device housing; and the program code enables the electronic device to provide functionality of operating a translation mechanism to slide the blade assembly relative to the device housing between a fully retracted position and a fully extended position by rolling the blade around the one end.

* * * * *